United States Patent
Gopal et al.

(10) Patent No.: US 10,433,208 B2
(45) Date of Patent: Oct. 1, 2019

(54) MULTI-MODEM USER TERMINAL AND POLICY-BASED MANAGEMENT FOR SATELLITE TRANSPORT RESILIENCY

(71) Applicant: Hughes Network Systems, LLC, Germantown, MD (US)

(72) Inventors: Rajeev Gopal, North Potomac, MD (US); Trevor Eagling, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/725,883

(22) Filed: Oct. 5, 2017

(65) Prior Publication Data

US 2018/0098247 A1    Apr. 5, 2018

Related U.S. Application Data

(60) Provisional application No. 62/404,742, filed on Oct. 5, 2016.

(51) Int. Cl.
*H04W 28/08* (2009.01)
*H04B 7/185* (2006.01)
(Continued)

(52) U.S. Cl.
CPC ........ *H04W 28/08* (2013.01); *H04B 7/18584* (2013.01); *H04L 45/28* (2013.01);
(Continued)

(58) Field of Classification Search
CPC . H04W 28/08; H04W 7/18584; H04W 45/28; H04W 47/122; H04W 47/125; H04W 49/25; H04W 24/08
See application file for complete search history.

(56) References Cited

U.S. PATENT DOCUMENTS

2002/0177448 A1    11/2002    Moran et al.
2003/0133443 A1    7/2003    Klinker et al.
(Continued)

FOREIGN PATENT DOCUMENTS

WO    WO2016054324 A1    4/2016

OTHER PUBLICATIONS

USPTO, "International Search Report & Written Opinion", PCT Application No. PCT/US2017/055347, dated Jan. 2, 2018.

*Primary Examiner* — Luat Phung

(74) *Attorney, Agent, or Firm* — Potomac Technology Law, LLC

(57) ABSTRACT

A method comprises monitoring, by a control module of a wireless communications terminal, factors related to a first data path for transmission/reception of data communications by the wireless communications terminal over a wireless data communications network. The control module then determines that the first data path is affected by condition(s), by determining that at least one of the factors satisfies a predetermined state reflecting the condition(s) affecting the first data path. The control module then determines a second data path, wherein the second data path is not affected by the conditions affecting the first data path. The control module then switches from the first data path to the second data path for the transmission/reception of the data communications by the wireless communications terminal over the wireless data communications network.

20 Claims, 22 Drawing Sheets

(51) Int. Cl.
  *H04L 12/803* (2013.01)
  *H04L 12/947* (2013.01)
  *H04W 24/08* (2009.01)
  *H04L 12/703* (2013.01)

(52) U.S. Cl.
  CPC .......... *H04L 47/122* (2013.01); *H04L 47/125* (2013.01); *H04L 49/25* (2013.01); *H04W 24/08* (2013.01)

(56) References Cited

U.S. PATENT DOCUMENTS

| | | |
|---|---|---|
| 2009/0245286 A1 | 10/2009 | Kore et al. |
| 2010/0269143 A1* | 10/2010 | Rabowsky ......... H04B 7/18591 725/63 |
| 2011/0280178 A1* | 11/2011 | Heifner ................. H04B 7/185 370/325 |
| 2012/0263161 A1 | 10/2012 | Harke et al. |
| 2012/0271686 A1* | 10/2012 | Silverman ............... G06Q 10/06 705/14.1 |
| 2014/0277917 A1* | 9/2014 | Banet ....................... G07C 5/00 701/31.5 |
| 2015/0271730 A1 | 9/2015 | Benammar et al. |
| 2016/0065615 A1* | 3/2016 | Scanzano ................ H04L 63/18 348/143 |
| 2016/0276747 A1 | 9/2016 | Davis et al. |

\* cited by examiner

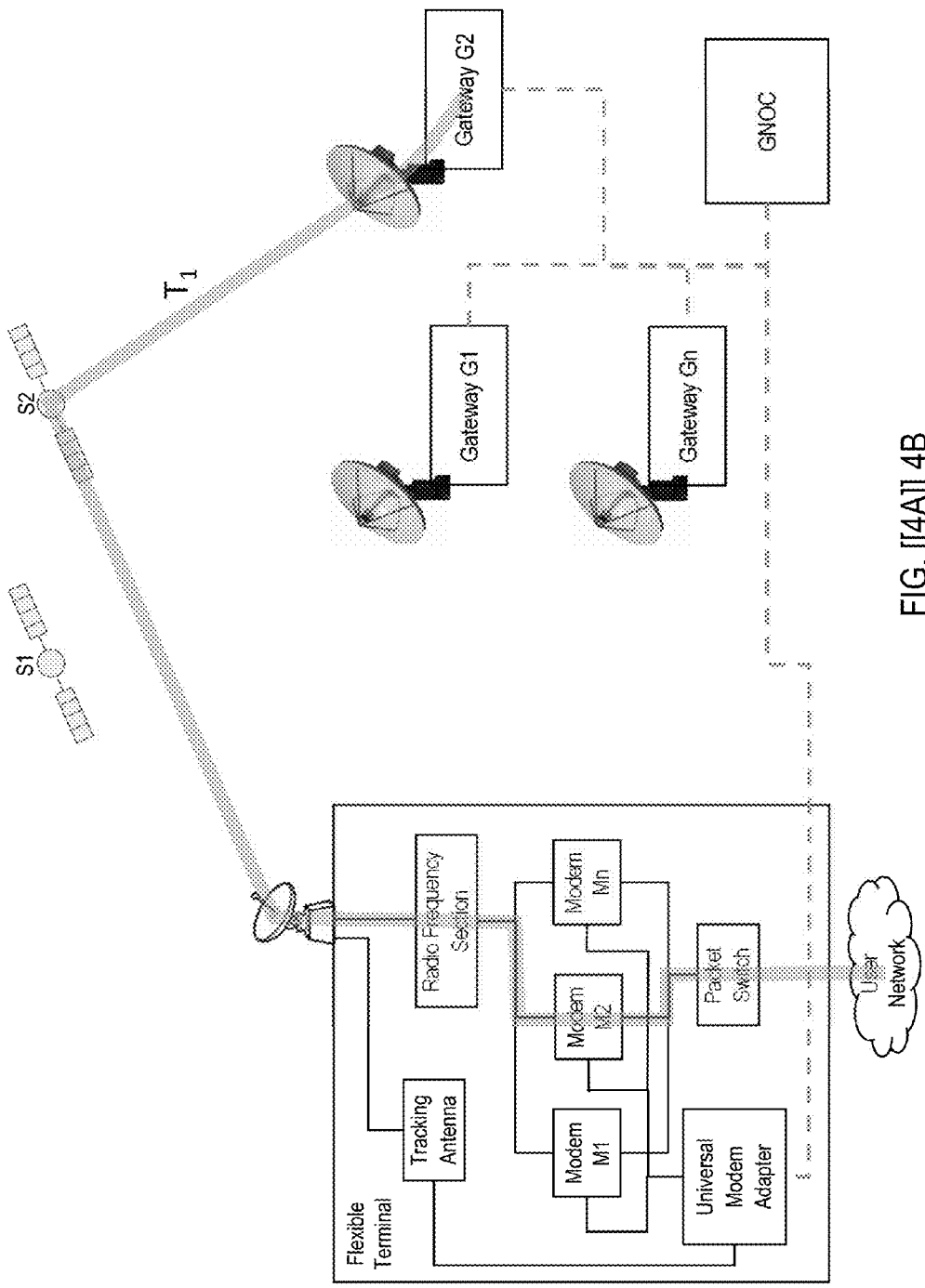
FIG. [[4A]] 4B

MULTI-MODEM USER TERMINAL AND POLICY-BASED MANAGEMENT FOR SATELLITE TRANSPORT RESILIENCY

RELATED APPLICATIONS

This application claims the earlier filing date under 35 U.S.C. § 119(e) from U.S. provisional patent application Ser. No. 62/404,742 (filed 2016-10-05), the entirety of which is incorporated herein by reference.

BACKGROUND

Over relatively recent years, data communications satellite systems have proven to be indispensable in meeting the goals of universal broadband connectivity, disaster response management and national security. The advent of high-throughput satellites with narrow Ka-band spot beams that facilitate spectral reuse has increased both aggregate and per-user data rates, enabling competitive Internet access over satellite transport. Today, such satellite systems primarily employ geo-synchronous orbit (GEO) satellites, however, with rapidly evolving space, networking and digital processing technologies, medium earth orbit (MEO) and low earth orbit (LEO), satellite systems are becoming more feasible. Such advances are facilitating the availability of high-capacity and low-cost satellite transports comprising GEO, MEO and LEO satellite systems (including combinations of different orbit satellites in the same system), with multiple bands, including L, X, Ku and Ka.

Further, unlike the terrestrial wireless ecosystem, which benefits from universal standards (such as 4G/LTE and Wi-Fi), the satellite communications industry has had limited success with waveform level interoperability across service providers and modem families. For example, FIG. 1 depicts a broadband satellite communications system operated by one or more service providers. The recent advances with narrow spot beams (e.g., in Ka-band), and spectrally efficient waveforms (e.g., DVB-S2 waveforms), have resulted in large aggregate system capacities and individual terminal data rates in an HTS system. A service provider operates their management system with automated terminal commissioning and satellite transport performance and fault data collection. This service provider management system maintains configuration databases that include network and RF transport-related parameter values refined to support the expected service level agreement for the user of the terminal. The satellite transport waveform describes the physical, data link, and to some extent, network layer interoperability between the terminal modem and the gateway modem. The user networks at remote and gateway sites are connected to the terminal modem with standards such as Ethernet and IP. The service provider configures bandwidth available for various forward and return links between a gateway and the associated terminals supported by the gateway. For example, a bandwidth pool is assigned to a gateway based on longer term business arrangements and service commitments. This pool can be sub-allocated dynamically by the gateway-level resource allocation function for supporting specific Radio Frequency (RF) links at various data rates.

Current high-throughput satellites, with 100+ Gbps throughput, have about 30 times higher capacity compared to wideband satellites (for example traditional Ku-band) and provide the first foundational feature in providing order-of-magnitude improvement. Becoming widely deployed worldwide, such high-throughput satellites can be leveraged for customer applications. A global or regional network operations center (NOC) orchestrates operations across multiple gateways operated by respective service providers. The NOC typically manages definitions for service-level agreements (SLAs) comprising factors, such as data rates, availability, packet loss and delay, which are associated with business agreements between a service provider and a customer. The NOC also collects processed fault, performance, security and accounting data from multiple gateways (via a management system) for global situational awareness and business management.

In such architectures, all requirements, under both routine and abnormal operating conditions, are met with a single service provider and a single satellite. There are, however, many realities that can compromise such simplistic assumptions, such as in the case of customers who require data communications (e.g., broadband satellite communications) over large geographical areas, and who are sensitive to price and operational constraints associated with a single service provider. This becomes especially difficult when satellite systems can be compromised, for example, by adversarial actions such as accidental or purposeful jamming of radio signals and cyber or physical attacks on terminals and gateways. Under such situations, the customer may require the flexibility to switch terminals between different satellites and also potentially between different service providers.

Problematically, though, since the use of standard waveforms is not a common industry practice across service providers, satellite or service provider transitioning may require the use of different modems within the satellite user terminal. In addition to physically swapping the modems (e.g., replacing modem X from service provider X to modem Y from service provider Y), the user and the service providers also need to undertake several manual steps for supporting the new modem and respective waveform. These steps require ad hoc communication between operations of service provider management systems and the operators at the NOC. Additionally, such transitions may require a significant amount of configuration at the gateway management system and terminal, manual steps for antenna pointing, RF transport reconfiguration and terminal commissioning at the remote terminal site. These manual steps in turn impose the prerequisite of business analysis and acquisition of satellite service/bandwidth with the new service provider, which can be time consuming (e.g., taking weeks to months) and overly expensive.

Further, today's satellite communications systems (e.g., at broadband rates) are primarily based on GEO orbit satellites. With the launch of systems based on lower orbit satellites (such as the O3B system based on MEO satellites), and plans for systems based on LEO satellites, or a combination of different orbit level satellites, interoperability across satellites would provide more flexibility and facilitate a larger trade space, with expanded benefits in coverage and lower delays in satellite data transport (e.g., round trip transmission delays via the satellites).

What is needed, therefore, are approaches for flexible satellite terminals that support multiple modems and waveforms, facilitating interoperability with multiple satellites (e.g., of differing bands, waveforms, orbit levels, etc.).

SOME EXAMPLE EMBODIMENTS

The present invention advantageously addresses the foregoing requirements and needs, as well as others, by providing architectures for flexible multi-modem satellite terminals (STs), and dynamic management approaches, which facilitate diverse satellite transport options.

In accordance with example embodiments, a method for a flexible ST is provided. The method comprises monitoring, by a control module of a wireless communications terminal, one or more factors related to a first data path for one or more of transmission and reception of data communications by the wireless communications terminal over a wireless data communications network. The method further comprises determining that the first data path is affected by one or more conditions, wherein the determination that the first data path is affected by the one or more conditions comprises determining that at least one of the one or more factors satisfies a respective predetermined state, wherein each predetermined state reflects at least one of the one or more conditions affecting the first data path. The method further comprises determining a second data path for the one or more of the transmission and reception of the data communications by the wireless communications terminal over the wireless data communications network, wherein the second data path is not affected by the one or more conditions affecting the first data path. The method further comprises switching from the first data path to the second data path for the one or more of the transmission and reception of the data communications by the wireless communications terminal over the wireless data communications network.

According to further example embodiments of the method, the wireless communications terminal utilizes a first modem for the first data path and utilizes a second modem for the second data path, and wherein the switching from the first data path to the second data path comprises switching from the first modem to the second modem.

According to further example embodiments of the method, the first modem is configured to communicate with a first satellite for the first data path over the wireless data communications network, and the second modem is configured to communicate with a second satellite for the second data path over the wireless data communications network.

According to further example embodiments of the method, an operational data path of the wireless communications terminal is configured to communicate with a first satellite of the wireless communications network utilizing a first modem of the wireless communications terminal for the first data path, and wherein the switching from the first data path to the second data path comprises switching the operational data path from the first modem to a second modem of the wireless communications terminal, and configuring the operational data path to communicate with a second satellite of the wireless communications network utilizing the second modem of the wireless communications terminal for the second data path.

According to further example embodiments of the method, the determination of the second data path comprises evaluating one or more strategy-based rules designed for achieving one or more characteristics for the one or more of the transmission and reception of the data communications over the wireless data communications network.

According to further example embodiments of the method, inputs considered in the evaluation of the one or more strategy-based rules comprise one or more of identification of one or more permitted satellites, identification of one or more approved service providers, identification of one or more appropriate transport services for the data communications, cyber state of one or more modems of the wireless communications terminal, radio frequency (RF) state of one or more links associated with respective satellites, time of day, a respective priority of each rule, a start time for each rule, and an end time for each rule.

According to further example embodiments, the method further comprises receiving, by the control module of the wireless communications terminal, one or more external factors related to the first data path, wherein the one or more external factors are received from a remote node of the wireless data communications network located remotely from the wireless communications terminal, and wherein the determination that the first data path is affected by the one or more conditions comprises determining that at least one of the one or more external factors satisfies a respective predetermined state, wherein each predetermined state reflects at least one of the one or more conditions affecting the first data path.

In accordance with example embodiments, an apparatus is provided. The apparatus comprises a control processor for controlling a wireless communications terminal. The control processor is configured to (i) monitor one or more factors related to a first data path for one or more of transmission and reception of data communications by the wireless communications terminal over a wireless data communications network, (ii) determine that the first data path is affected by one or more conditions, wherein the determination that the first data path is affected by the one or more conditions comprises determining that at least one of the one or more factors satisfies a respective predetermined state, wherein each predetermined state reflects at least one of the one or more conditions affecting the first data path, (iii) determine a second data path for the one or more of the transmission and reception of the data communications by the wireless communications terminal over the wireless data communications network, wherein the second data path is not affected by the one or more conditions affecting the first data path, and (iv) switch from the first data path to the second data path for the one or more of the transmission and reception of the data communications by the wireless communications terminal over the wireless data communications network.

According to further example embodiments, the apparatus further comprises a first modem configured to facilitate the one or more of the transmission and reception of the data communications via the first data path, and a second modem configured to facilitate the one or more of the transmission and reception of the data communications via the second data path, and wherein the switching from the first data path to the second data path comprises switching from the first modem to the second modem.

According to further example embodiments of the apparatus, the first modem is configured to communicate with a first satellite for the first data path over the wireless data communications network, and the second modem is configured to communicate with a second satellite for the second data path over the wireless data communications network.

According to further example embodiments, the apparatus further comprises a first modem and a second modem, and wherein the control processor is further configured to control an operational data path of the wireless communications terminal to communicate with a first satellite of the wireless communications network utilizing the first modem for the first data path, and wherein the control processor is configured to switch from the first data path to the second data path by switching the operational data path from the first modem to the second modem and configuring the operational data path to communicate with a second satellite of the wireless communications network utilizing the second modem for the second data path.

According to further example embodiments of the apparatus, the determination of the second data path comprises evaluating one or more strategy-based rules designed for achieving one or more characteristics for the one or more of the transmission and reception of the data communications over the wireless data communications network.

According to further example embodiments of the apparatus, inputs considered in the evaluation of the one or more strategy-based rules comprise one or more of identification of one or more permitted satellites, identification of one or more approved service providers, identification of one or more appropriate transport services for the data communications, cyber state of one or more modems of the wireless communications terminal, radio frequency (RF) state of one or more links associated with respective satellites, time of day, a respective priority of each rule, a start time for each rule, and an end time for each rule.

According to further example embodiments of the apparatus, the control processor is further configured to receive one or more external factors related to the first data path, wherein the one or more external factors are received from a remote node of the wireless data communications network located remotely from the wireless communications terminal, wherein the determination that the first data path is affected by the one or more conditions comprises determining that at least one of the one or more external factors satisfies a respective predetermined state, wherein each predetermined state reflects at least one of the one or more conditions affecting the first data path.

According to further example embodiments, the apparatus further comprises a digital IF switch connected to the first and second modems, wherein the digital IF switch is configured to perform a component function of the switching of the operational data path from the first modem to the second modem under control of the control processor.

According to further example embodiments, the apparatus further comprises a packet switch connected to the first and second modems, wherein the packet switch is configured to perform a component function of the switching of the operational data path from the first modem to the second modem under control of the control processor.

According to further example embodiments, the apparatus further comprises an antenna and an antenna controller connected to the antenna, and wherein the antenna controller is configured to control the antenna to switch from pointing to the first satellite to pointing to the second satellite, under control of the control processor.

According to further example embodiments, the apparatus further comprises a data network interface, a packet switch, a digital IF switch and a radio frequency transmitter/receiver, and wherein the packet switch is connected between each of the first and second modems and the data network interface, and, as a function of the switch from the first data path to the second data path, the packet switch is configured to switch the data network interface from the first modem to the second modem, under control of the control processor, and wherein the digital IF switch is connected between each of the first and second modems and the radio frequency transmitter/receiver, and, as a function of the switch from the first data path to the second data path, the digital IF switch is configured to switch the radio frequency transmitter/receiver from the first modem to the second modem, under control of the control processor.

According to further example embodiments, the apparatus further comprises an antenna and an antenna controller connected to the antenna, and wherein, as a function of the switch from the first data path to the second data path, the antenna controller is configured to control the antenna to switch from pointing to the first satellite to pointing to the second satellite, under control of the control processor.

In accordance with example embodiments, a system is provided. The system comprises a plurality of satellites, a gateway terminal (GW) and a satellite terminal (ST), wherein the ST comprises a control processor configured to monitor one or more local factors related to a first data path for one or more of transmission and reception of data communications between the ST and the GW via a first of the plurality of satellites. The control processor of the ST is further configured to determine that the first data path is affected by one or more conditions, wherein the determination that the first data path is affected by the one or more conditions comprises determining that at least one of the one or more internal factors satisfies a respective predetermined state, wherein each predetermined state reflects at least one of the one or more conditions affecting the first data path. The control processor of the ST is further configured to determine a second data path for the one or more of the transmission and reception of the data communications between the ST and the GW via a second of the plurality of satellites, wherein the second data path is not affected by the one or more conditions affecting the first data path. The control processor of the ST is further configured to control the ST to switch the one or more of the transmission and reception of the data communications between the ST and the GW from the first data path to the second data path.

According to further example embodiments, the system further comprises a network operations center (NOC), located remote from the ST, wherein the NOC comprises a network management processor configured to monitor one or more external factors related to the first data path, and to transmit the monitored one or more external factors to the ST, and wherein the control processor is further configured to receive the one or more external factors from the NOC, and wherein the determination that the first data path is affected by the one or more conditions comprises determining that at least one of the one or more external factors satisfies a respective predetermined state, wherein each predetermined state reflects at least one of the one or more conditions affecting the first data path.

According to further example embodiments of the system, the ST further comprises a first modem and a second modem, and wherein the control processor of the ST is further configured to control an operational data path of the ST to communicate with the first satellite utilizing the first modem for the first data path, and wherein the control processor ST is further configured to switch from the first data path to the second data path by switching the operational data path from the first modem to the second modem and configuring the operational data path to communicate with the second satellite utilizing the second modem for the second data path.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which:

FIGS. 4A-4B depict two system states of an autonomous selection, by the Terminal management agent (TMA) of a flexible ST, of an alternate satellite link, where FIG. 4A depicts the system state at time $T_0$ and FIG. 4B depicts the system state at time $T_1$, in accordance with example embodiments of the present invention;

DETAILED DESCRIPTION

Figure 1:
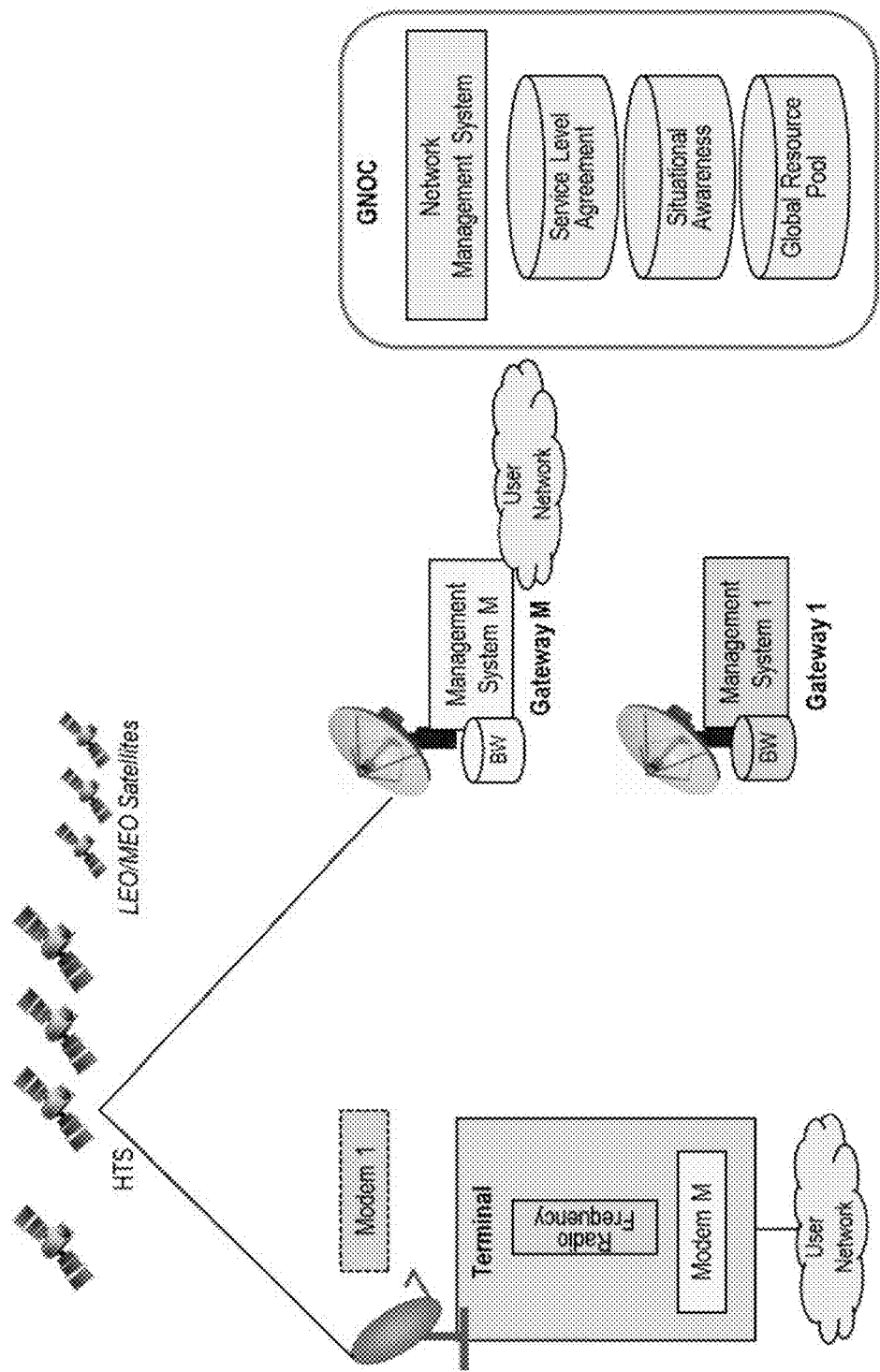
FIG. 1 depicts a diagram of a current broadband satellite communications system operated by one or more service providers.

Architectures for flexible satellite terminals capable of supporting multiple modems and waveforms, and dynamic management approaches within a flexible satellite system architecture, which facilitate diverse satellite transport options including interoperability with multiple satellites (e.g., of differing bands, waveforms, orbit levels, etc.) and central network management, are described. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

According to example embodiments, such flexible ST architectures may support modems of various kinds, such as modems with a Software Defined Radio (SDR) platform for additional flexibility and modems with commercial spread-spectrum waveforms with anti-jamming and lower probability of intercept and lower probability of detection (LPI/LPD) capabilities. According to such example embodiments, such ST architectures may also facilitate customer articulated specific service level agreements (SLAs) at a terminal level, with appropriate transport solutions dynamically selected within associated cost and operational constraints, while optimizing availability, quality of service (QoS) and other parameters. Further, such architectures may also enable regional and global mobility, and automated handover for mobile platforms for modems and systems that lack such features. Further, such diverse transport options, for example, may encompass multiple dimensions, including spectral bands, orbits, satellite platforms, offered service types, business models and service provider specific options. Further, such dynamic management approaches, for example, may include automated decision-making within an ST to select one or more of these diverse options based on existing external conditions, including user traffic characteristics, adverse circumstances (such as accidental or purposeful interference), cyber situational awareness and cost factors.

According to example embodiments, the multi-modem ST architecture comprises a novel universal modem adapter (UMA), which is under direct policy control of a network operations center (NOC) powered by a unified management system (UMS). According to such embodiments, the flexible terminal architecture facilitates the use of multiple modems with diverse capabilities, each potentially operated by a service provider and using different waveforms. By way of example, to leverage this architecture, a service provider management system may employ high-level policy directions from the customer management system without requiring any changes in the existing waveform, modem and gateway operated by the service provider. Further, such architectures may be used with satellites in multiple orbits, as well as with transports based on airborne and terrestrial networking nodes.

According to example embodiments, such multi-modem terminal architectures provide several benefits towards providing a more efficient, cost-effective and resilient satellite transport for a customer, including:

Interoperability across commercial HTS and government satellites

Interoperability across geosynchronous earth orbit (GEO), medium earth orbit (MEO), and low earth orbit (LEO) satellites Better competition by automatically selecting more cost-effective service provider for granular transport Portability of satellite communications service profiles across satellites Service resiliency with satellite switchover (for mitigation against jamming)

Automated transformation of RF-related configuration parameters based on service definitions and satellite capabilities Satellite bandwidth sharing across terminals and service providers with aggregate resource pool management across service providers Rule-based arbitration to ensure bandwidth allocation based on mission priority Enabler of automated mobility management for gateways and service provider management systems that lack this feature Enabler of global mobility for systems that support mobility only for regional networks Enhancement of fixed modem/gateway system to provide mobility as a feature Comprehensive situational awareness to support resiliency for a customer—satellite bandwidth pools and satellite switchover—modem fault and performance monitoring across all modems Use of modems from multiple manufacturers/service providers for better competition Cloud-based UMS for orchestrating network management at a global level with automated provisioning and diversity management According to further example embodiments, the provided architectures can be extended to support other platforms and user applications, including (i) high altitude platforms (HAP) including balloons and UAV-based network nodes, (ii) terrestrial wired and wireless transports for additional transport diversity, (iii) multiple RF antennas for load sharing and additional resiliency (for example, line-of-sight blockage encountered on naval ships), (iv) digital Interface (between a common RF signal digitizer and multiple modems) within FTA so that the IF switch can be eliminated (common packet switch can transport digitized samples to the selected modem).

In further accordance with example embodiments, a Unified Management System (UMS) provides general orchestration guidance for dynamic resource pool allocation, global situational awareness, and policy-based SLAs. By way of example, the UMS may leverage several innovative features, including operational efficiency with remote management, data analytics, protocol engines, and rule-based engines for automated resource planning. By way of further example, the UMS may be based on standardized technologies and protocols, such as OpenAMIP, TCP/IP, Ethernet, JASON, HTTP, SNMP and XML, which maximizes flexibility and interoperability across ground equipment from multiple vendors.

According to further embodiments, the provided flexible ST architectures may be based on the enterprise integration of mature commercial technologies to deliver reliable and resilient communications. Further, the ST architectures may directly address the potential "order of magnitude" improvements with the judicious application of high-throughput satellites and related state-of-the-art technologies, including an innovative Universal Modem Adapter (UMA), for resiliency with autonomous policy-based management and comprehensive enterprise management with the Unified Management System (UMS) empowering a Global Network Operations Center (GNOC).

By way of example, the provided architectures utilize existing and new satellite communication waveforms, robust orchestration of diverse and redundant satellite communications assets, terrestrial network diversity, dynamic resource allocation and comprehensive network and mission management. Further, the provided architectures achieve significant benefits by coordinating the building blocks under policy-based management, and ultimately coordinated at the GNOC level.

By way of further example, the provided approaches may be based on proven commercial technologies, architectures, and business capabilities. Individual satellite communications system building blocks, which enable an enterprise customer to effectively access satellite resources, are adapted for interoperability across service providers. Such architectures and commercial technologies can be leveraged in implementing Terminal-to-Modem UMA Adapter and ground enterprise level integration (including data, control and management planes) with the UMS for affordable and resilient satellite communications systems.

By way of further example, the UMA facilitates diversity and provides the ability to access multiple service providers. Further, the UMA facilitates the use of multiple modems within the same terminal under direct management control of the GNOC. Additionally, the UMA can further provide autonomous policy-based control over the selection of specific satellites, cyber security monitoring and posture control, and mission-based Quality of Service (QoS) and Service Level Assurance (SLA) decision-making. Moreover, with high-throughput satellites, which use multiple spot beams requiring several gateways per satellite, the provided UMA and management interface between the GNOC and the service provider's management system (MS) facilitates interoperability (on the customer level) across service providers without incurring any cost for the implementation of the entire high-throughput satellite enterprise. The provided UMA further facilitates complete control of a terminal (including the radio and user network interfaces that are common across all modems individually managed by respective service providers) by the GNOC.

Additionally, the provided flexible ST architectures further facilitate a large customer (such as government, global service provider, or a multinational firm) to promote interoperability across service providers with the use of the provided UMA. Under this framework, such a customer can benefit from diversity and redundancy that are enabled with the possibility of using multiple modems and their respective gateways and management systems for diverse satellite transports, including wide beam Ku, narrow beam Ka (e.g., via high-throughput satellites) and future MEO and LEO constellations.

Flexible Satellite Terminal Architecture

Figure 2:
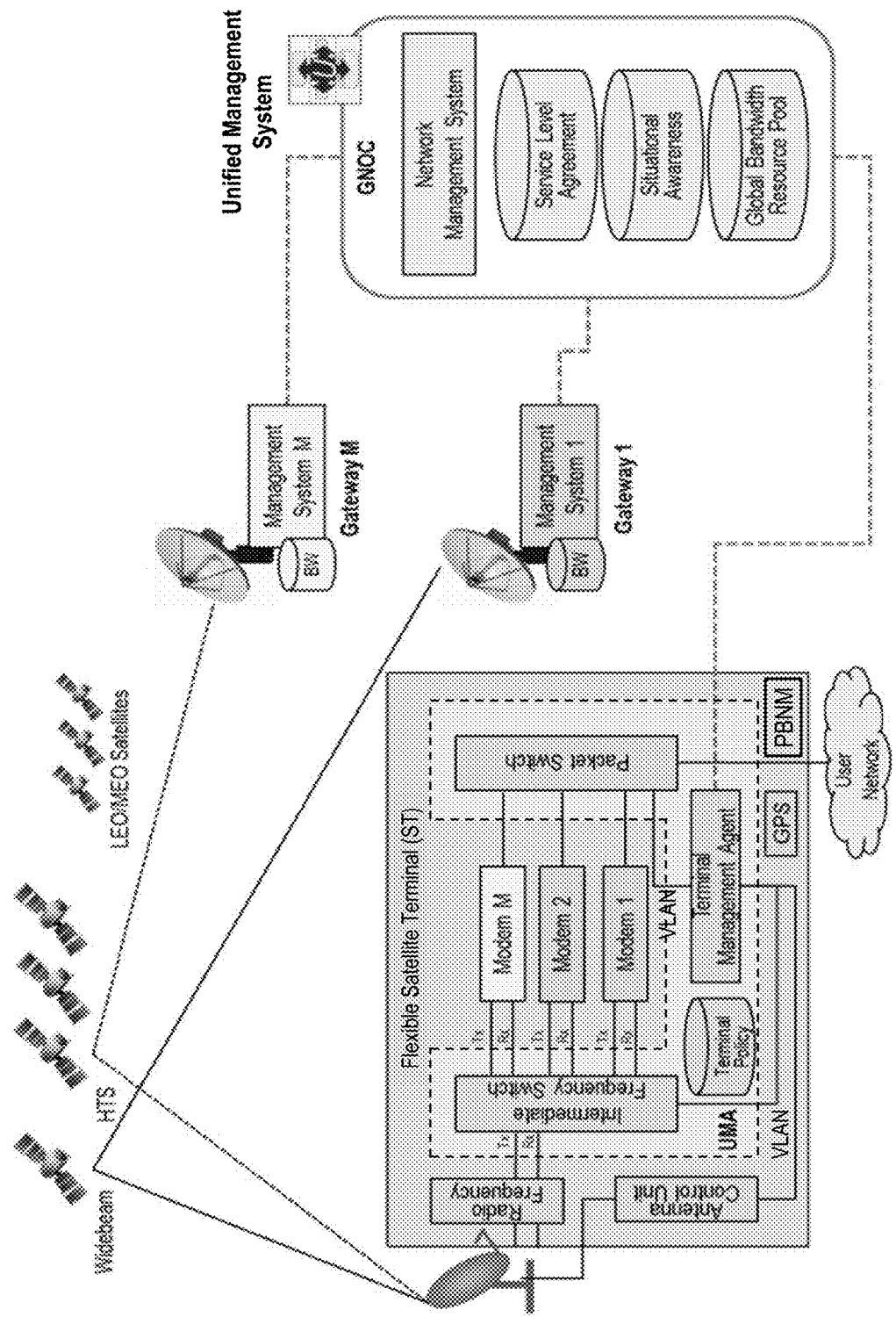
FIG. 2 depicts a diagram illustrating an example architecture of a flexible satellite terminal (ST), employing a universal modem adapter (UMA), which facilitates interoperability with multiple satellites of a satellite communications system, in accordance with example embodiments of the present invention.

FIG. 2 depicts a diagram illustrating an example architecture of a flexible satellite terminal (ST), employing a universal modem adapter (UMA), which facilitates interoperability with multiple satellites (e.g., wide-beam satellites, high throughput satellites and LEO/MEO satellites, of differing bands, waveforms, orbit levels, etc.) of a satellite communications system, in accordance with example embodiments of the present invention. With reference to FIG. 2, such a system generally comprises a plurality of flexible satellite terminals (of which only one is shown in the Figure), a user network accessing each such ST, a unified management system (UMS), and a plurality of gateways interfacing with the UMS (gateway 1, . . . , gateway M). The UMS (or global network operations center—GNOC) generally comprises the traditional components of a network operations center, which are enhanced to support the programmatic interfaces with the individual management systems (e.g., gateways) of various service providers and the policy-based management of the TMA. Such components of the GNOC comprise a network management system (NMS), a service level agreements (SLA) database, a situational awareness database, and a global bandwidth pool database. With regard to satellites, such a system may include one or more wide-beam satellites, one or more high throughput satellites (HTSs), and one or more constellations of LEO and/or MEO satellites.

In accordance with such example embodiments, the flexible ST architecture comprises a radio frequency (RF) unit, an antenna control unit (ACU), a plurality of modems (modem 1, modem 2, . . . , modem M), a policy-based network management channel (PBNM), and one or more universal modem adapters (UMAs) (of which only one is shown in FIG. 1, outlined by a dashed line). The ST may further include a global positioning system (GPS) unit, which enables the ST to determine its location and provide the associate location information to other entities of the system/network. The multiple modems are accommodated within the terminal via the UMA. The UMA comprises the intermediate frequency (IF) switch, a terminal policy database, a terminal management agent (TMA) and a packet switch. The TMA performs the primary management function of the flexible ST. By way of example, the TMA manages the interoperation and orchestration for data packet management, control and management plane interactions among modems, and antenna management (e.g., control of tracking antenna functions). By way of further example, such management of the ST by the TMA is performed in accordance with policy-based controls (stored in the terminal policy database) managed by the respective global network operations center (GNOC), which includes additional features to support such flexible terminals.

In further accordance with such example embodiments, the TMA controls the evaluation of various factors affecting the communications data path orchestrated by the ST between the user network and a remote node of the overall communications network (e.g., a remote gateway). The TMA further controls the policy or strategy based rule evaluation of the ST whereby the factors are used to determine one or more states of the ST and the data path, and to evaluate alternative options for the data path based on the configuration of the applicable rules—for example, designed to achieve certain characteristics for the respective data path (e.g., based on respective service-level subscriptions and required service-level agreements, including transport types, quality of service requirements, security requirements, etc.). Further, based on the outcome of the rule evaluations, the TMA controls the switching of the data path within the ST and the respective configuration of the data path over the network (e.g., over a selected satellite). In this regard, the TMA controls the packet switch to connect the user network to the appropriate selected modem for routing of the incoming data packets from the selected modem to the user network and for routing the outgoing data packets from the user network to the selected modem. Similarly, the TMA controls the IF switch to connect the transmit/receive functions of the radio frequency unit to the appropriate selected modem for routing the incoming data signals from the receiver section to the selected modem for demodulation and decoding and for routing the outgoing data signals from the selected modem to the transmission section for transmission to the respective satellite.

Further, as would be appreciated by one of skill in the art, such a flexible ST architecture may be implemented in various different configurations. By way of example, the flexible ST of example embodiments may be packaged in a form similar to current satellite terminals, where an outdoor unit (ODU), comprising the antenna and associated RF waveguide and other components, interface via an IF connection and other control interfaces (e.g., for control of a tracking antenna) with an indoor unit (IDU), for example, comprising the ACU, UMA module (the IF switch, terminal policy database, packet switch, TMU), GPS module, PBNM module, user network interface, etc. By way of further example, the flexible ST of example embodiments may be packaged in a modular form. Such a modular form, for example, may still include the ODU, comprising a tracking antenna and associated RF components, which would again interface with an IDU. In this alternative form, however, the IDU may be implemented in a modular form (e.g., a rack-mounted system), where each of the different IDU components may be implemented in separate rack-mounted modules. For example, the ACU, UMA, GPS, PBNM may be implemented in one or more rack-mounted modules, and each of the modems may further be implemented in a separate rack-mounted module. Such a modular configuration would facilitate efficient expandability and scalability in that additional modems could be added with respect of software upgrades to expand the interoperability of the flexible ST. Further, in a commercial setting, the flexible ST can be initially configured based on the customers service subscriptions and associated SLAs (e.g., encompassing a configuration for interfacing with only certain satellites of the system), and could easily be subsequently upgraded based on further service subscriptions and associated SLAs added to the customer account (e.g., encompassing an expansion to add additional modems for interoperability with additional satellites of the system). As would be appreciated, such flexibility in implementation can facilitate potentially endless business models (e.g., potentially encompassing interoperability with multiple satellite systems of different system operators and service providers) and associated configurations.

In further accordance with such embodiments, at the link and network layers, the packet switch (e.g., with IP routing and Ethernet switching capability) provides connectivity among the user port and the user-facing port of each modem, and with the TMA. The TMA manages multiple virtual local area networks (VLANs) within the terminal. A dedicated management VLAN is used for the local management of all terminal components under the control of the TMA. Another VLAN is used for all control signaling among the terminal components, which may include signal strength information that is provided to the ACU by each modem and the overall control of the ACU by the TMA. Further, a data VLAN may be used for exchanging user data packets with the modems. The LANs may further be instrumented and monitored to assess cyber operating conditions and detect any threat or attack. The IF switch, under the control of the TMA, connects the multiple modems with the RF unit and antenna. By way of example, different satellite orbits and spectral bands may have diversity in the use of RF polarization (circular or linear), which requires the use of automated polarization switching when transitioning across satellites and modems. By way of further example, amplification of the RF signal may require a single wideband amplifier (e.g., covering both commercial and government Ka-band), and cost considerations may require the use of multiple RF blocks, each suited for a specific band.

According to example embodiments, the UMA connects the user network (e.g., at the packet level—e.g., Ethernet and/or IP), the terminal antenna at the IF level (e.g., for user traffic over satellite transport), and Ethernet/Router (e.g., for antenna tracking control). The UMA also provides full management control from the GNOC. By way of example, the UMA is centrally positioned within a terminal to select a specific satellite, control QoS, provide policy-based network management (PBNM) functions for the NMS, and enable mission-specific cyber protection. An optional narrowband feature of UMA may facilitate direct connectivity to the NMS, for example, in the event that the primary transport is not available for the management channel.

According to example embodiments, the TMA provides certain terminal-level management functions, such as: (i) health and status monitoring of various terminal components; (ii) managing IF connectivity between the antenna and modems; (iii) management of user data packet connectivity between modem ports and terminal user ports; (iv) selection of specific modems for user data transmission over satellite port; (v) selection of specific satellites for user data transmission; (vi) directing antenna (via ACU) to point to (and track if needed) a specific satellite; (vii) collection of cyber situational awareness information and decision making for threat and attack mitigation. The TMA is directly managed by the GNOC to ensure transparency and consistency with respect to control over the terminal functions, which may have multiple modems managed by potentially different service providers. By way of example, the TMA may include an intrusion detection system (IDS) and an intrusion prevention system (IPS). Further, the TMA controls the use of modems for various types of data traffic and SLAs. By way of example, the TMA provides packet-level policing, filtering and policy control (in both directions to and from the user network) for better situational awareness and cyber protective measures. By way of further example, the TMA and NMS management channel(s) may be protected with encryption and authentication mechanisms, such as Transport Level Security (TLS) (e.g., based on AES-256).

According to example embodiments, for terminal policies, the terminal policy database provides local storage for NMS policies and a list of viable satellites and service provider networks for the terminal. Based on the terminal policy information stored in the databased, the TMA then performs respective decision-making functions, such as selecting a specific satellite to point to, based on one or more factors, such as (i) terminal location, (ii) mission and terminal priority, (iii) time of day, (iv) required mission service and QoS, (v) other situational conditions, such as weather, RF interference and cyber situations. By way of example, terminal policy may be defined as a set of rules, with each rule being based on one or more major components or factors. The policy or rule condition components may have one or more factors that resolve to either True or False, expressed as a structured Boolean formula with AND and OR operators. The action part of a rule may code the execution of a specific decision made by a rule engine within the TMA when the condition of the rule evaluates to True.

According to example embodiments, the following table summarizes some typical factors for a specific terminal, where some of the values have been abstracted based on raw observables (e.g., very low signal-to-noise ratio (SNR) associated with RF signals indicates that the RF link may be Unusable). Further, the GNOC may have embedded additional priorities associated with users, terminals and services in the definition of individual rules for a specific terminal.

partially or fully replace policies based on the changing business, operational and traffic situations.

Figure 3:
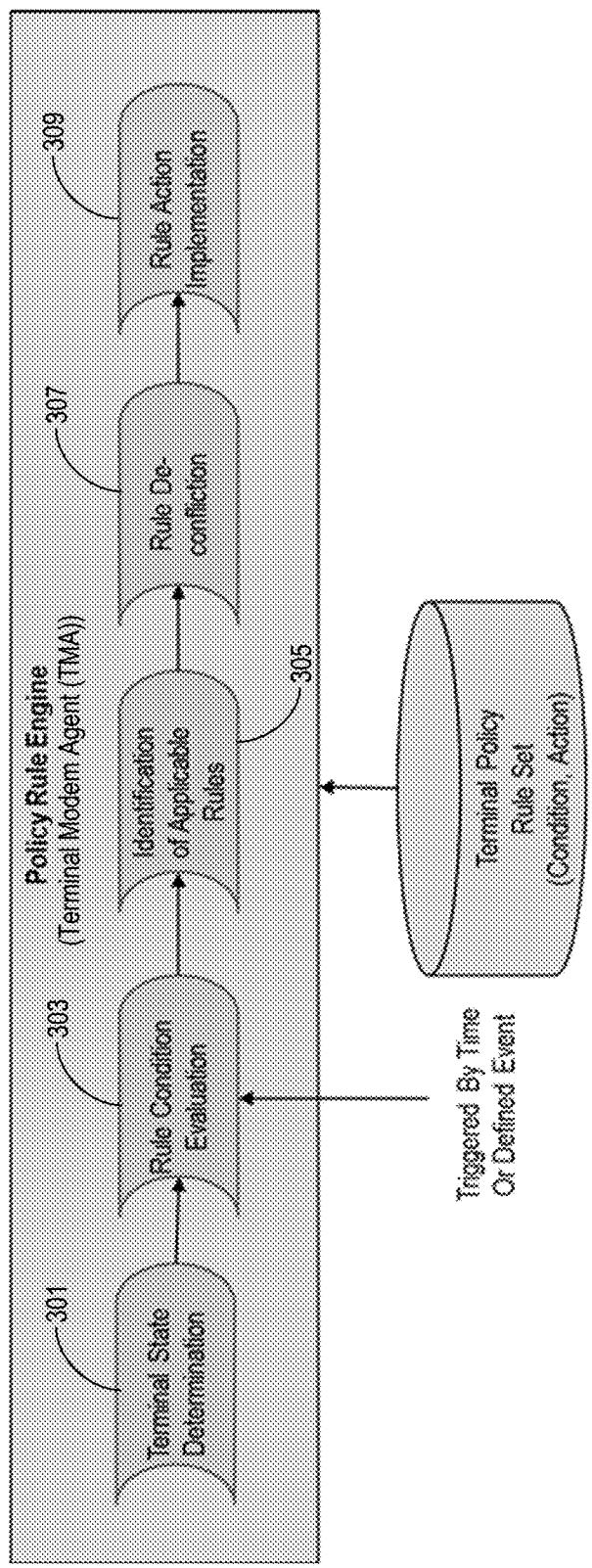
FIG. 3 depicts the flow of the execution of an example policy rule set by the policy rule engine within the Terminal management agent (TMA) of a flexible ST, in accordance with example embodiments of the present invention.

According to example embodiments, the policies may be executed by a policy rule engine within the TMA. FIG. 3 depicts the flow of the execution of an example policy rule set by the policy rule engine within the Terminal management agent (TMA) of a flexible ST, in accordance with example embodiments of the present invention. The terminal state determination step (Step 301), for a policy execution cycle, comprises a determination of the terminal state that will be utilized for the rule set execution (e.g., the decision to use the current snapshot of all relevant information available within the terminal, or the determination of the set of finite information inputs that will be used to execute

| Factor | Description | Value | Comments |
|---|---|---|---|
| Satellite | Satellite (and beam if applicable) with orbital location | Satellite ID | Set of satellites that can be used by the terminal |
| Service Provider | Operates modem, gateway, and (element) management system | Service Provider ID | Set of service provider with business arrangement to potentially provide service for the terminal |
| Transport Service | Described by SLA (data rate, packet loss, delay, availability) | Service ID (SP) | Set of services offered by a service provider for the terminal |
| Cyber State | Condition of the packet processing part of a specific modem as reported by monitoring packet switch | Normal, Affected, Unusable | Possible states for a specific modem in the terminal |
| RF State | Condition of RF link of a specific satellite of the terminal deduced from monitoring RF signal | Normal, Affected, Unusable | Possible states for the RF link associated with a specific satellite |
| Time | Current time (various granularity) when a particular condition or action is applicable | Minute, Hour, Day, WorkDay, WeekendDay, Week, Month | Both absolute and recurring time and day |
| Priority | Precedence of a rule used for de-confliction | 1 to P (1 being highest priority) | P is a large number, higher than the total number of rules |
| Start Time | Time when a rule, condition, or action starts | YYYY MM DD HH MM SS | Provides additional time-based filtering in rules |
| End Time | Time when a rule, condition, or action ends | YYYY MM DD HH MM SS | Provides additional time-based filtering in rules |

According to example embodiments, the following table summarizes some typical examples for policy rules.

| Rule | Condition | Action | Comments |
|---|---|---|---|
| Satellite Selection | RFstate (satelliteA) == Inoperable AND RFstate (satelliteB) == Normal | SwitchTo (SatelliteB) | TMA will instruct the ACU to repoint to Satellite B by changing Azimuth and Elevation angle of the antenna |
| Service Provider Selection | CyberState(Modem1) == Inoperable AND Service1 | SwitchTo (Modem1) AND SwitchTo (ServiceProvider1) | Service Provider 1 offers services only on satellite B and uses a waveform supported by Modem1. |
| Duration of Service | StartTime > 1 Feb. 2017 EndTime < 2 Mar. 2017 | SwitchTo(Modem1) | Business relationship with Service Provider 1 starts on a certain date. |

According to further example embodiments, policies are defined, validated and provided to the TMA by the GNOC. Because the GNOC has a global view of all terminals and networks, it is better suited to identify and refine a complete set of policies consistent with the overall objectives and optimization considerations for a customer and service providers. The policies for a terminal may be stored in a local database (e.g., so that permanent connectivity between NMS and TMA is not required). Further, the NMS can decide to the policy determination). This is followed by a rule condition evaluation step (Step 303), which iterates overall policy rule sets to perform the next step (Step 305) of a determination of all applicable rules based on the condition evaluation (e.g., overall Boolean value of the condition set for a policy rule comprising multiple factors evaluates to True). By way of example, once the identification of all applicable rules is completed, all such applicable rules may be sorted based on respective priority attributes. By way of further example, the rule condition evaluation may be triggered based on a time trigger or an event trigger. A time trigger, for example, may consist of a predetermined time when a first LEO satellite (via which a flexible ST is communicating during a given time period) travels to a point where the beam coverage is about to move beyond the cell within which the flexible ST is located—at which point in time, a switchover to a second LEO satellite that has traveled to a point where the beam coverage has just begun to cover the cell within which the flexible ST is located. An event trigger, for example, may comprise an event that renders the current communication path of a flexible ST untenable—e.g., based on a jamming event, blockage by a structure (such as a building), or other event than renders the path unreliable, unsustainable or otherwise unusable. As would be appreciated, one of ordinary skill in the art would be able to envision a multitude of time triggers and trigger events, whereby the TMA of a flexible ST may be triggered to initiate a change in the communications path of the ST, without departing from the scope of example embodiments of the present invention. The rule de-confliction step (Step 307) consists of an evaluation to ensure that there is no conflict between the actions of two applicable rules. An example would be that the individual actions of two applicable rules point to two different satellites. Such a conflict, for example, may be resolved by selecting the action of the rule with a higher priority. Once all applicable rules have been identified, and any conflicts have been resolved, the respective actions are executed (Step 309), which completes one such policy rule set execution cycle.

According to example embodiments, the Terminal State Determination includes collection of raw terminal performance and fault data indicative of the behavior of both various terminal components and external conditions surrounding its operation. By way of example, state machine based decision making may be used to process this raw data to determine a more granular state of the terminal along various dimensions. Such a state machine approach would ensure that the terminal state determination software can easily be configured by the GNOC by refining the number of states and events (raw information values) that control transitioning across these states. By way of further example, a terminal may start in the IDLE state for the terminal model that represents the RF interference environment around the terminal. Further, the modem may periodically (e.g., every second) send a measurement of RF SNR to the TMA, and an acceptable SNR value takes the terminal to the NORMAL state. IN the NORMAL state, the TMA (within the UMA) continually monitors and analyzes operation conditions (e.g., circumstantial or environmental conditions, and/or inputs from external sources such as the GNOC) Then, in a case where the SNR value falls below a first predetermined threshold, the terminal RF state may transition to an AFFECTED state, whereby, while in this state, continued SNR degradation beyond a second predetermined threshold can take the terminal to an UNUSABLE RF state (which would provide an event trigger for the rule condition evaluation step), while SNR reverting to above the first threshold would bring the ST back to the NORMAL state. Carefully selected threshold values are used that impart hysteresis to state transitioning can be employed to avoid thrashing (SNR value oscillating around a value). Alternatively, a single threshold may be applied to determine an UNUSABLE RF state, such that the AFFECTED STATE may be eliminated.

By way of further example, some typical Rule Action Implementation actions performed by the TMA may include (i) set inflow and outflow characteristics of the packet switch to be compatible with the selection of the modem, (ii) activate the network-level routing policies and configuration of the packet switch to control load balancing and traffic engineering objectives at the wide area network level, (iii) activate packet switch configuration for mobility (including network mobility)-related protocols that provide the same external IP address for the terminal for preserving ongoing transport level sessions, (iv) select a modem and specific service plan on the modem (out of multiple possibilities), (v) select a satellite with the appropriate amount of resources committed at the service provider level.

According to example embodiments, for modem control, there are several ways in which a modem can be controlled by the TMA. Some modems may include a local management plane interface (e.g., using XML/HTTP), in which case the TMA can directly control the behavior of the modem (activation, deactivation and finer control—such as selection of a specific service plan). Alternately, carefully crafted policies in the GNOC (e.g., with start and end times) can be provided to the TMA concurrently with similar policies provided to the service provider management system for the modem. By careful coordination, the GNOC can ensure expected behavior of the modem for the duration. In case no such management path exists (e.g., either local or via the service management system), then the TMA can take a more brutal force action. Most modems will stop transmitting, per regulatory constraints, if their receipt path is switched off. Thus, the IF switching by the TMA can indirectly force a modem to stop its transmit and receive (Tx/Rx) functions. Further, the TMA can control power supplied to a modem (e.g., via a controllable power distribution unit (PDU)), and can control the duration for which a modem is used.

Further, via the policy-based network management (PBNM) channel, the UMA/GNOC can reach the NMS via the primary satellite communications channel or with the use of a narrowband satellite communications channel dedicated for the PBNM management channel. By way of example, the UMA can use one or more of the following waveforms for the narrowband management channel: (i) L-band global LEO satellite system; (ii) L-band global GEO satellite system; (iii) Ku, X, and Ka-band with spread spectrum waveforms (allows small apertures, such as microsatellite applications).

According to example embodiments, various different policy rule engine inputs may be contemplated and processed by the flexible ST, including both internally monitored conditions, and external conditions monitored by other elements of the network (e.g., distributed control/data centers or gateway sites, and/or a central control center such as the GNOC). By way of example, external dynamically changing conditions may include one or more of RF signal strength indicators (RSSI), signal to noise ratio (SNR) monitoring, packet queue status (e.g., one or more for local user network based on traffic types) monitoring, and intrusion detection system (IDS) or interference alerts. By way of further example, relatively static internal conditions may include one or more of service type (e.g., uplink and downlink data rate, quality-of-service objectives, etc.), permitted/subscribed satellites for each service type, terminal priority level (e.g., based on each service type and satellite), cost of service type, time of day (e.g., peak versus off-peak hours), and terminal location. By way of further example, based on such policy engine network/terminal condition inputs, circumstances or events for triggering the rules engine process (e.g., for switching modem or satellite) may include one or more of SNR falling below a predetermined minimum threshold for the current path or satellite link and the current modem of the path, RSSI falling below a predetermined minimum threshold for the current path or satellite link and the current modem of the path, a high-priority alert from an IDS indicating a cyber-attack on a specific modem, packet queue status indicating queue length becoming larger than a predetermined minimum threshold the specified threshold for a specified duration (e.g., indicating congestion in the current path threatening satisfaction of respective service-level requirements, which may trigger changing the satellite/service provider path until congestion alleviates), no packets being received on a modem for a specific duration (indirect indication that the satellite link, satellite, or the current gateway is non-operational), no packets in queues for transmission for a specific duration (indirect indication that there may be denial of service attack on the local user network), new policies from GNOC which remove the use of a specific satellite or service type for a specific modem or terminal, new policies that make changes in priorities, costs of service etc., which may lead to the use of a different satellite (and service provider/gateway supporting the modem), change in time (e.g., off-peak service change to a different satellite because of cost/priority considerations).

Figure 4A:
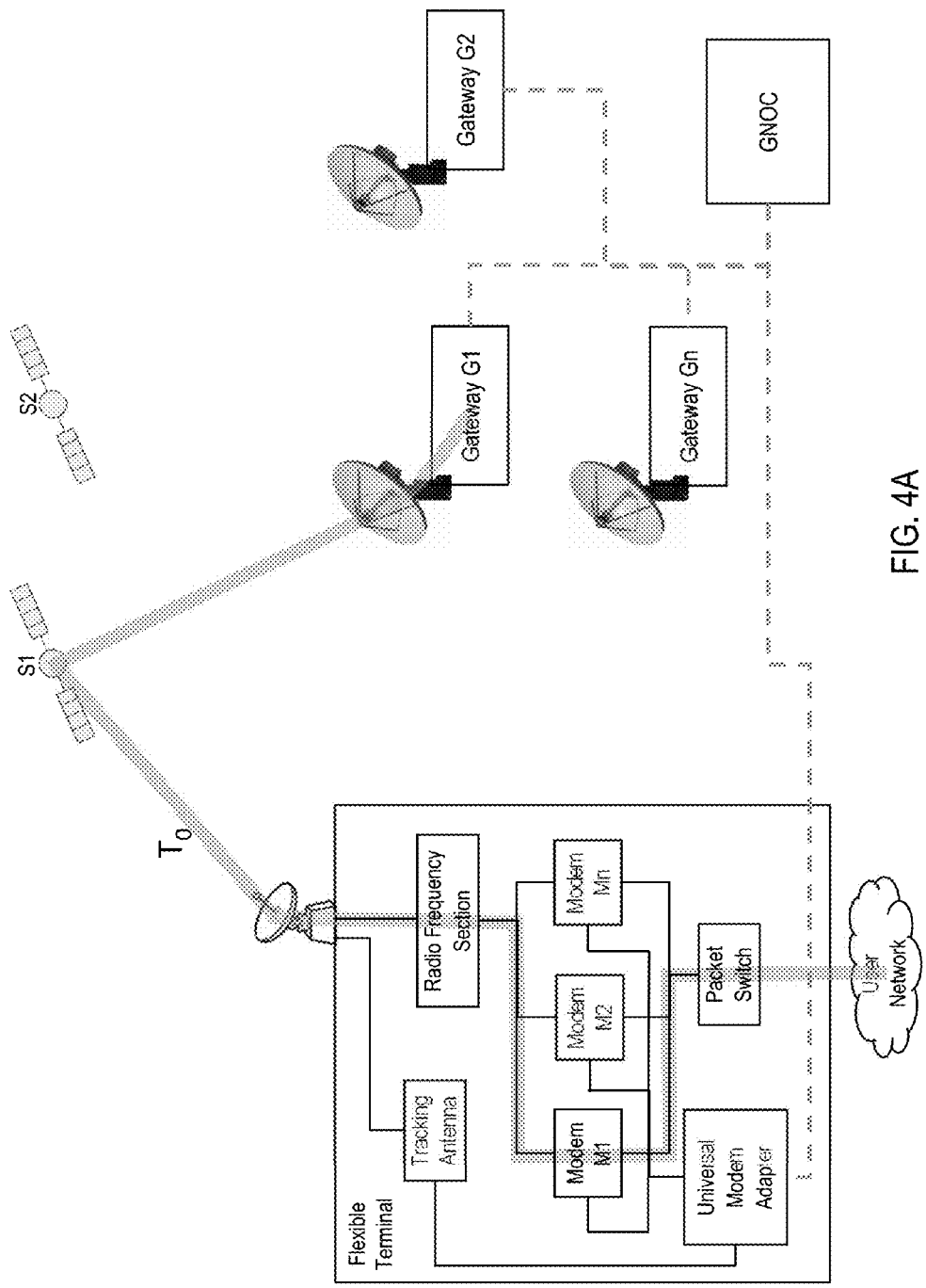

FIGS. 4A-4B depict two system states of an example policy execution of an autonomous selection, by the Terminal management agent (TMA) of a flexible ST, of an alternate satellite link—where FIG. 4A depicts the system state at time $T_0$ and FIG. 4B depicts the system state at time $T_1$, in accordance with example embodiments of the present invention. Further, FIGS. 5A-5C depict an example flow diagram of the policy execution of FIGS. 4A-4B, in accordance with example embodiments of the present invention.

Figure 5A:
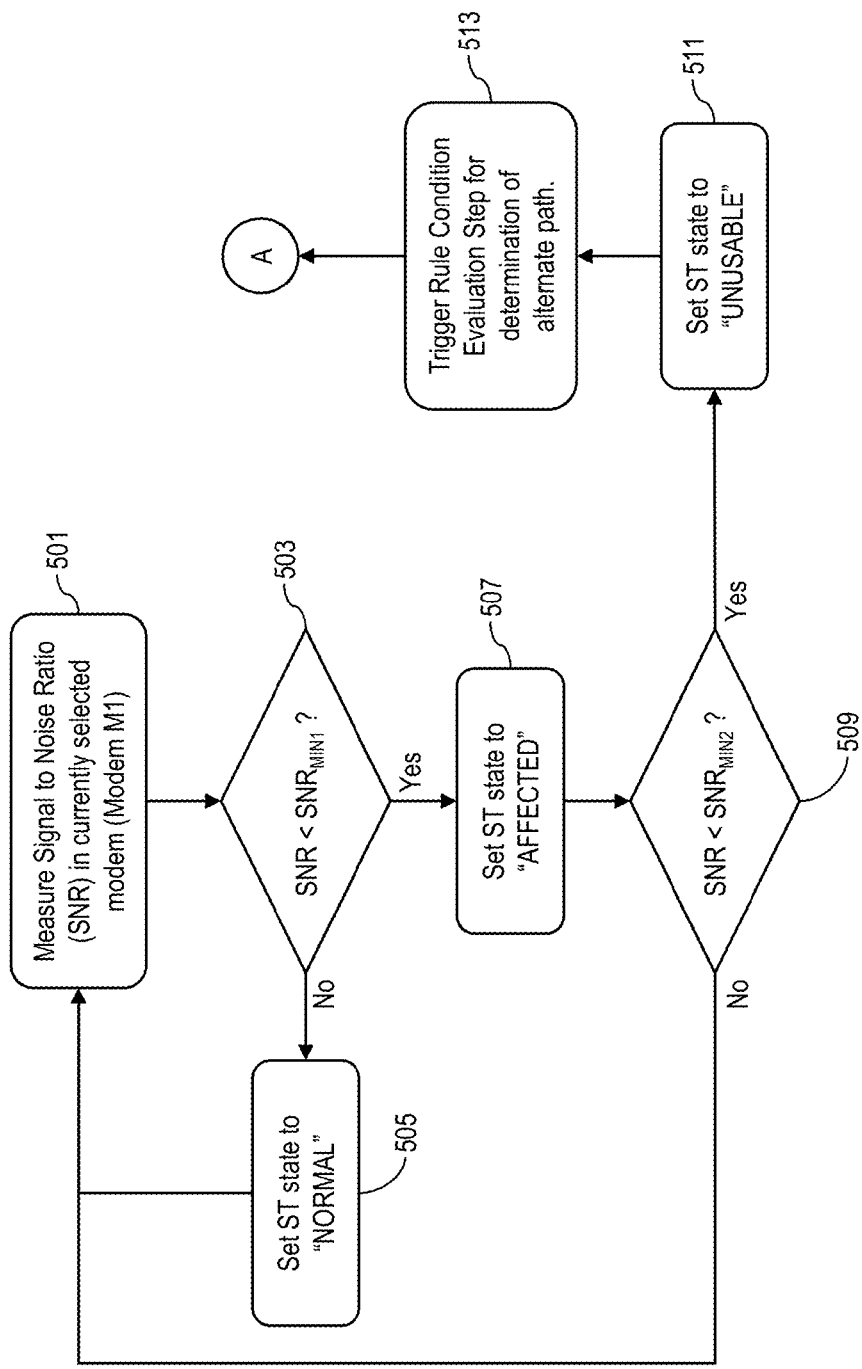
FIGS. 5A-5C depict an example flow diagram of the policy execution of FIGS. 4A-4B, in accordance with example embodiments of the present invention.
Figure 5B:
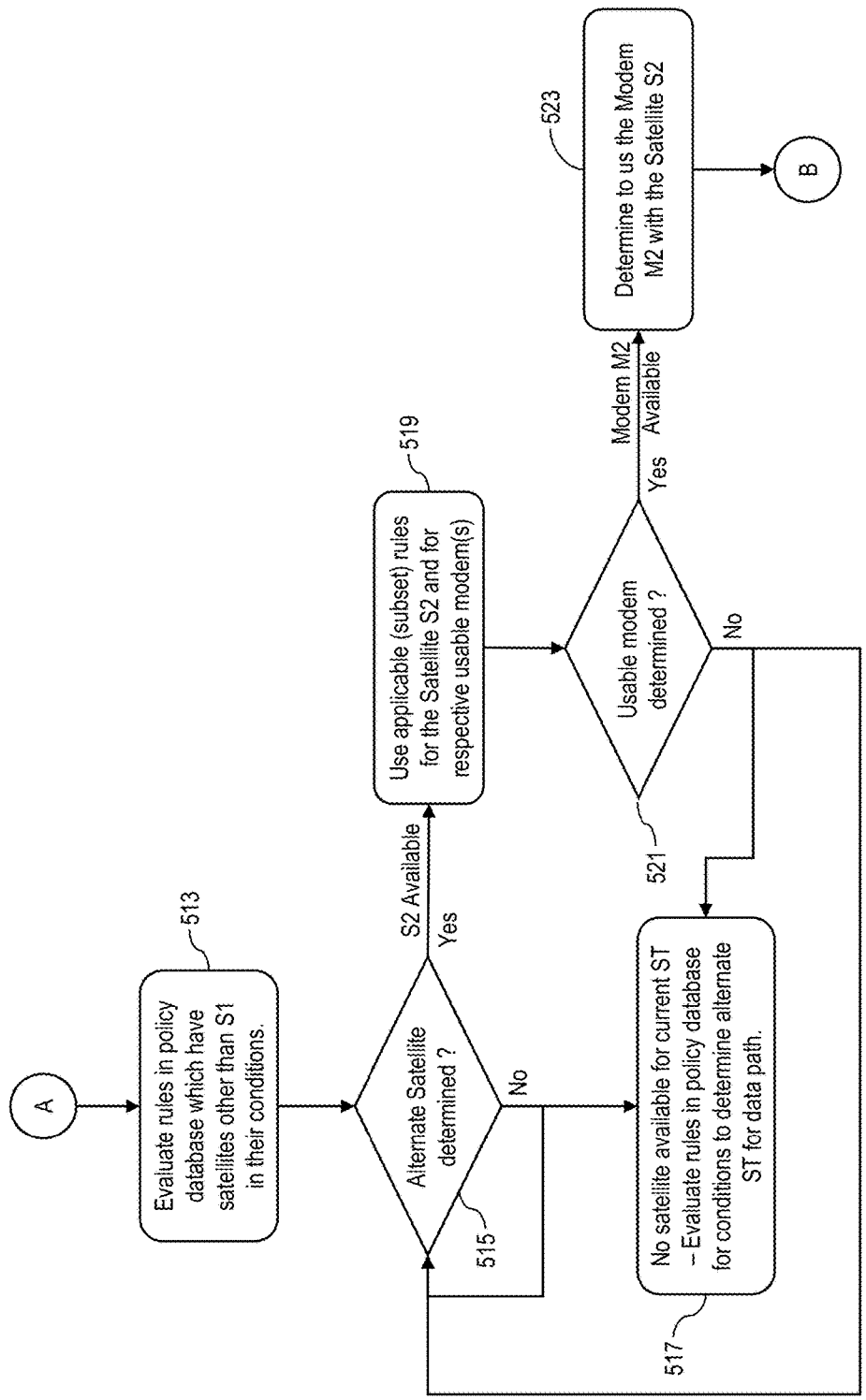
Figure 5C:
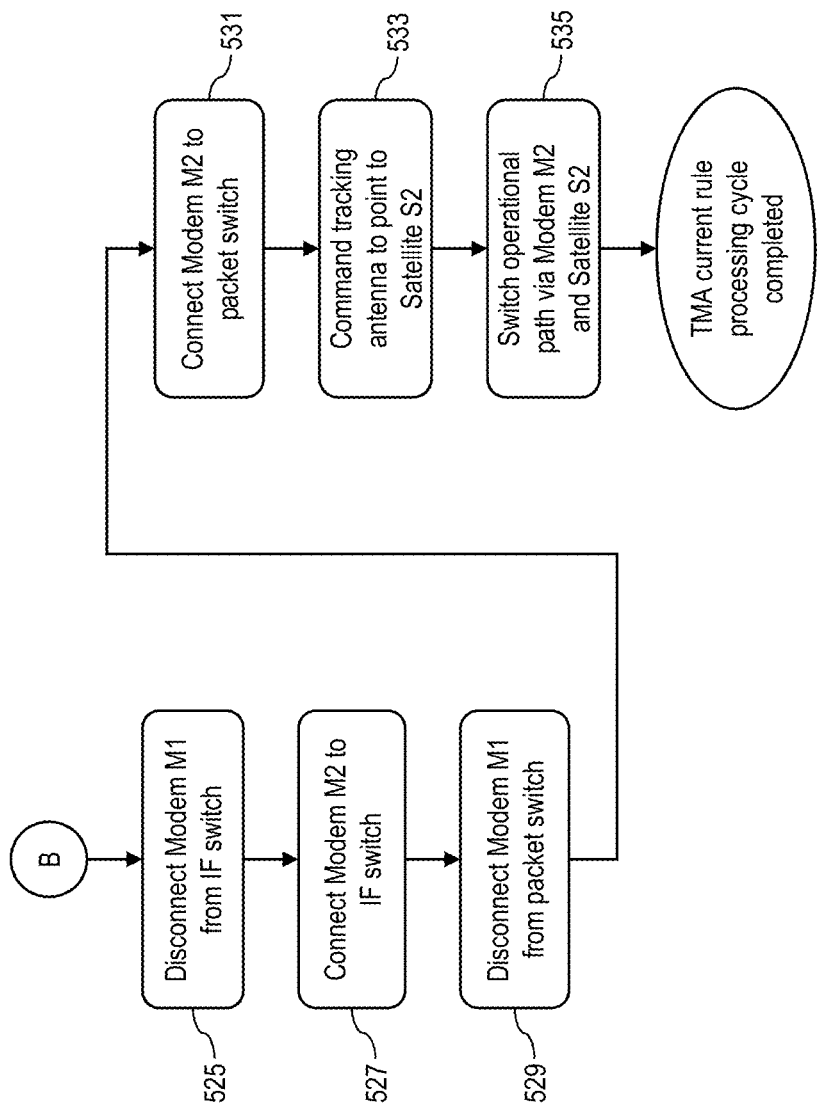

With reference to FIGS. 4A and 5A, at time $T_0$, the flexible ST is operating in a NORMAL state, whereby the ST is managing a data path between the user network and the Gateway 1 via the modem 1 and the satellite S1. At Step 501, the ST measures the signal to noise ratio (SNR) of the current Modem (Modem 1). At Step 503, the ST determines whether the SNR is less than the first threshold $SNR_{MIN1}$. If it is determined that the SNR is not less than the first threshold, then the process proceeds to Step 505 where the ST state is set to NORMAL, and the process returns to Step 501. Alternatively, if it is determined that the SNR is less than the first threshold, then the process proceeds to Step 507 where the ST state is set to AFFECTED, and the process then proceeds to Step 509. At Step 509, the ST again measures the SNR to determine whether the SNR is below the second threshold $SNR_{MIN2}$. If it is determined that the SNR is not less than the second threshold, then the process returns to Step 501. Alternatively, if it is determined that the SNR is less than the second threshold, then the process proceeds to Step 511 where the ST state is set to UNUSABLE, and the process then proceeds to Step 513. At Step 513, the rule condition evaluation step is triggered for the determination of an alternate path.

According to the Rule Condition Evaluation and Identification of Applicable Rules steps, based on the analysis of the current operating conditions of the ST and the determined ST state, for example, the TMA may have determined that the current data path should be switched to an alternate satellite (if an alternate satellite is determined to be currently available). Accordingly, at Step 513, the TMA evaluates rules in the policy database that have satellites other than the satellite S1 in their conditions. Then at Step 515, the ST determines whether an alternate satellite is available. If it is determined that no alternative satellite is available, various different alternatives may be employed. For example, according to a first alternative, the process could proceed to Step 517, where the ST is determined unusable and further rules in the policy database may be evaluated for conditions to determine an alternate ST for the data path (e.g., the user network may be terrestrially connected to an ST in another location that has an available path to the Gateway 1 or to an alternative gateway). According to a second alternative, the process could loop back within the Step 515 until an alternate satellite is determined.

Once an alternate satellite is determined (e.g., the satellite S2 is available), the process proceeds to Step 519 where the applicable subset rules for the satellite S2 and the respective usable modem(s) are used, and the process proceeds to Step 521 whereby the TMA determines whether a usable modem is available. If it is determined that no usable modem is available, various different alternatives may be employed. For example, according to a first alternative, the process could again proceed to Step 517, where the ST is determined unusable and further rules in the policy database may be evaluated for conditions to determine an alternate ST for the data path. According to a second alternative, the process could loop back to the Step 515 until a further alternate satellite is determined. If it is determined that a usable modem is available (e.g., the Modem 2), in the process proceeds to Step 523 where is determined to use the Modem 2 with the Satellite S2.

At this point, the UMA executes the switch to the Modem M2 and the Satellite S2. At Step 525, the UMA disconnects the Modem M1 from the IF switch, and at Step 527 connects the Modem M2 to the IF switch. At Step 529 the UMA disconnects the Modem M1 from the packet switch, and at Step 531 connects the Modem M2 to the packet switch. At Step 533, the UMA commands the tracking antenna to point to the Satellite S2. Then at Step 535, the UMA switches the operational data path to operate via the Modem M2 and the Satellite S2—which is illustrated in FIG. 4B showing the data path at time $T_1$.

According to example embodiments, the flexible ST utilizes an IF switch that is controlled by the TMA (within the UMA). Instead of an analog IF switch, a digital IF switch is employed to provide additional flexibility and other benefits for the flexible ST. In addition to flexible modem connectivity, the digital processing capabilities of a digital IF switch facilitates additional functionality that can be added external to the modems, which enables the implementation of such additional functionality in a single common element that can be employed with virtually any terminal modem (e.g., including currently available legacy modems) without having to apply modifications to the modems themselves. Further, digital IF switch provides for improved performance, and it also facilitates software defined functions. Additionally, controlled by the TMA, a digital IF switch is better situated for addressing emerging service and operations objectives (e.g., in contested and noisy environments). A digital IF can also interface with multiple modems concurrently, which can increase terminal capacity, especially in the presence of multiple tracking antennae for concurrent multi-satellite operation.

By way of example, digital IF capabilities/advantages include no degradation in the receive signal, faster switching and better performance, multiple modems can share common RF, granular spectrum sensing, and spectrum channelization and processing. Further, potential applications include interference avoidance, equalization for powers, transponder flatness (Transmit (Tx) or Receive (Rx)), pre-distortion to enable driving the power amplifier harder or using a smaller power amplifier, legacy modem with restricted frequency/channel, RF situational awareness for detecting jamming/weather/etc., and spread spectrum capability for legacy modems.

Figure 6:
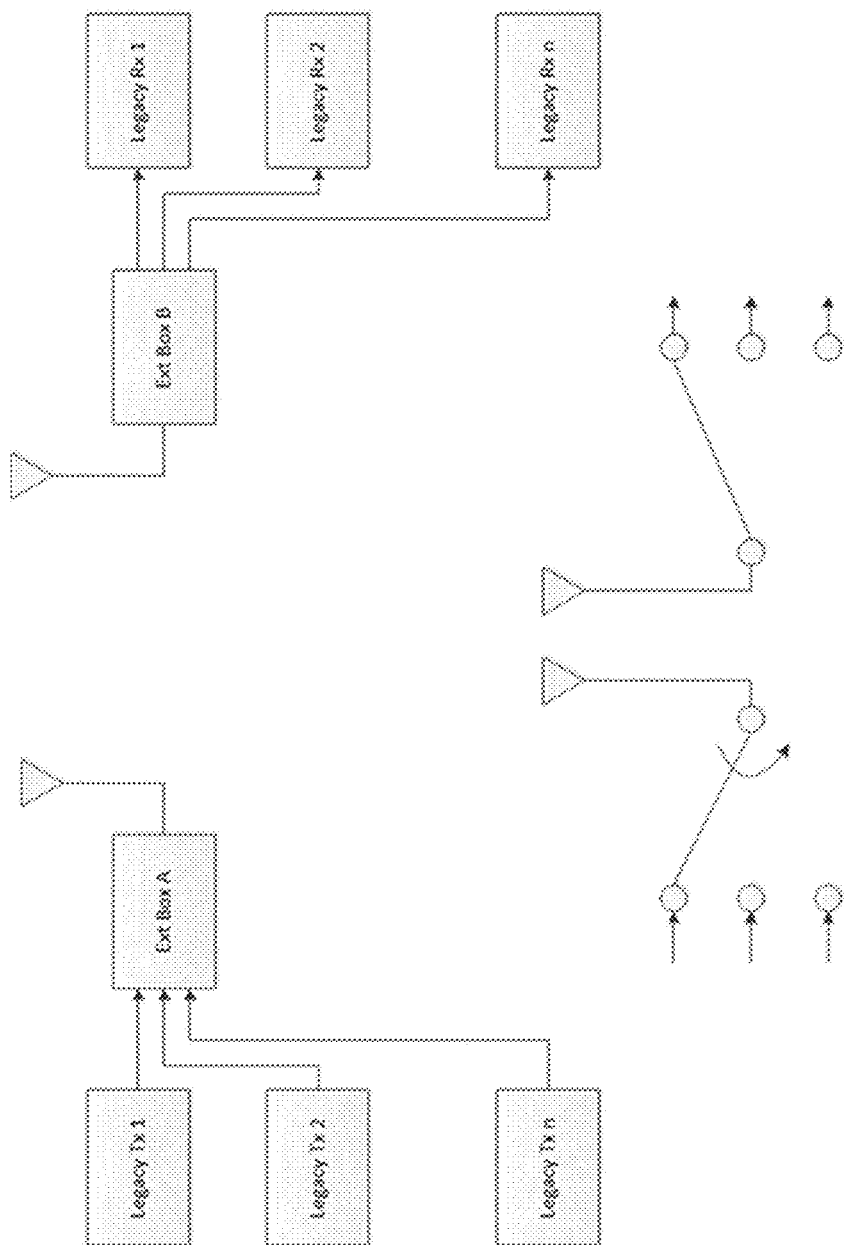
FIG. 6 illustrates a traditional mechanical analog IF switch.
Figure 7A:
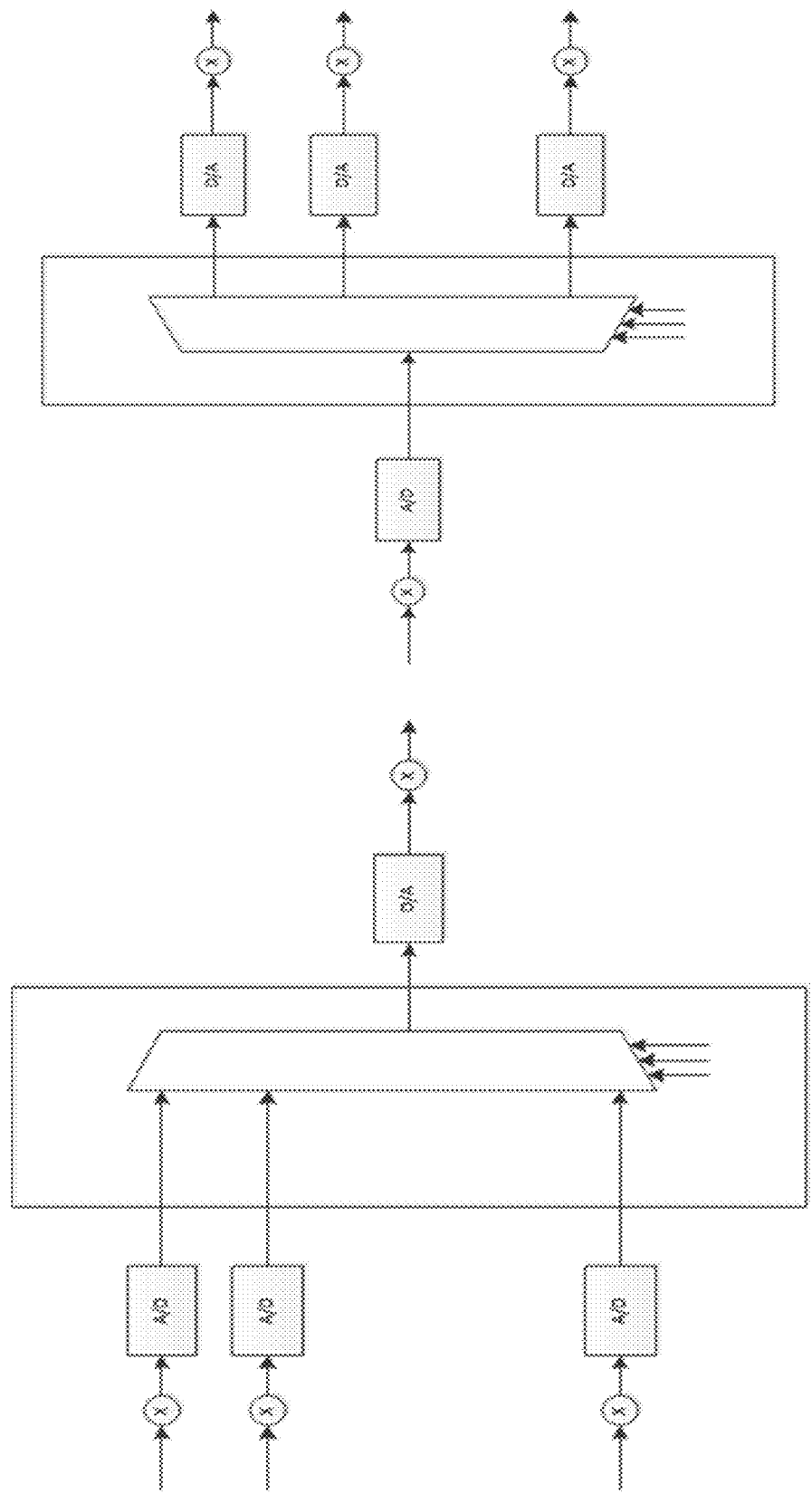
FIG. 7A depicts a high-level diagram of example digital IF switching for static multiplexing at the transmitter side and demultiplexing at the receiver side, in accordance with example embodiments of the present invention.

The traditional analog IF switch is a mechanical switch with limited functionality. While settings on the mechanical analog switches may change, analog switches tend to be statically configured. When the settings need to be changed, the change is made slowly. The analog mechanical switches create essentially a pass-through path for the selected settings, which potentially may be signal-degrading as shown in FIG. 6, which illustrates a traditional mechanical analog IF switch. In accordance with example embodiments, however, by digitizing the IF signals at the input, and reconstructing the signals at the output, the original signals can retain their integrity without signal loss. For example, the digital mux/demux block in FIG. 7A can be statically set to mimic the analog switch of a traditional analog IF switch. FIG. 7A depicts a high-level diagram of example digital IF switching for static multiplexing (mux) at the transmitter side and demultiplexing (demux) at the receiver side, in accordance with example embodiments of the present invention.

In further accordance with example embodiments, the digital multiplexing and demultiplexing (mux/demux) functionality can be implemented inside reconfigurable logic (e.g., field programmable gate arrays (FPGAs)) such that other functionalities can be included to enhance the switching function.

Figure 7B:
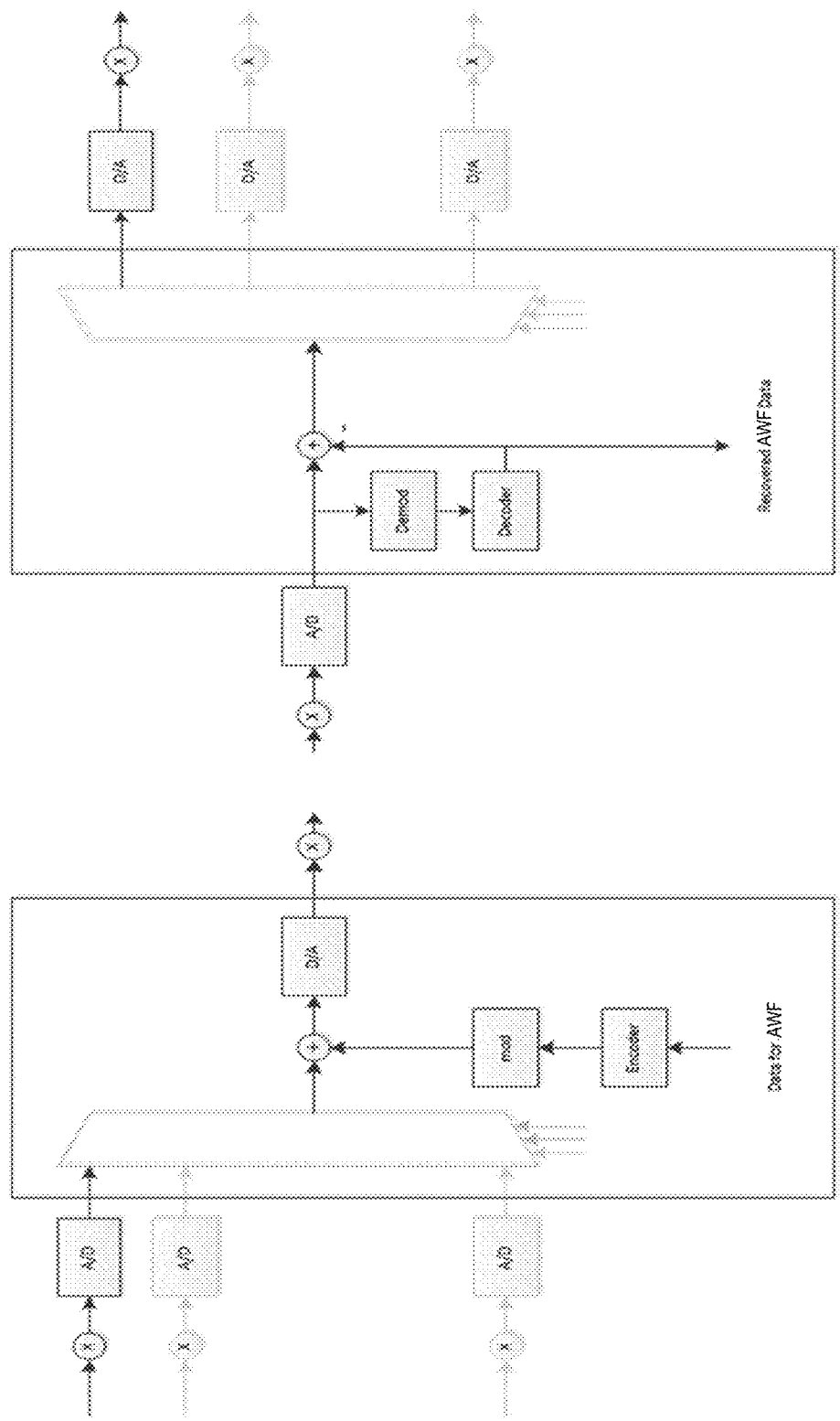
FIG. 7B depicts a high-level diagram of an example carrier-under-carrier functionality implemented via a digital IF switch, in accordance with example embodiments of the present invention.

By way of example, an additional advanced waveform (AWF) transmission—such as a DVB-S2 waveform, a microsat waveform for small terminal applications (e.g., as described in the U.S. Patent Publication No. US9203431B2), a scramble-coded multiple access (SCMA) waveform (e.g., as described in the U.S. Patent Publication Nos. US9461765B2, US8683292B2, US8619974B2)—can be sent along with the selected modem/radio transmission, such the carrier-under-carrier functionality shown in FIG. 7B—which depicts a high-level diagram of an example carrier-under-carrier functionality implemented via a digital IF switch, in accordance with example embodiments of the present invention. The additional waveform operates at sufficiently low power so as to not elevate the aggregate power and thus achieve low-probability of detection. The additional transmission may then be recovered at the receiving side, and removed from the receiving signal before forwarding the residual through the demultiplexer for the targeted receiver.

Figure 7C:
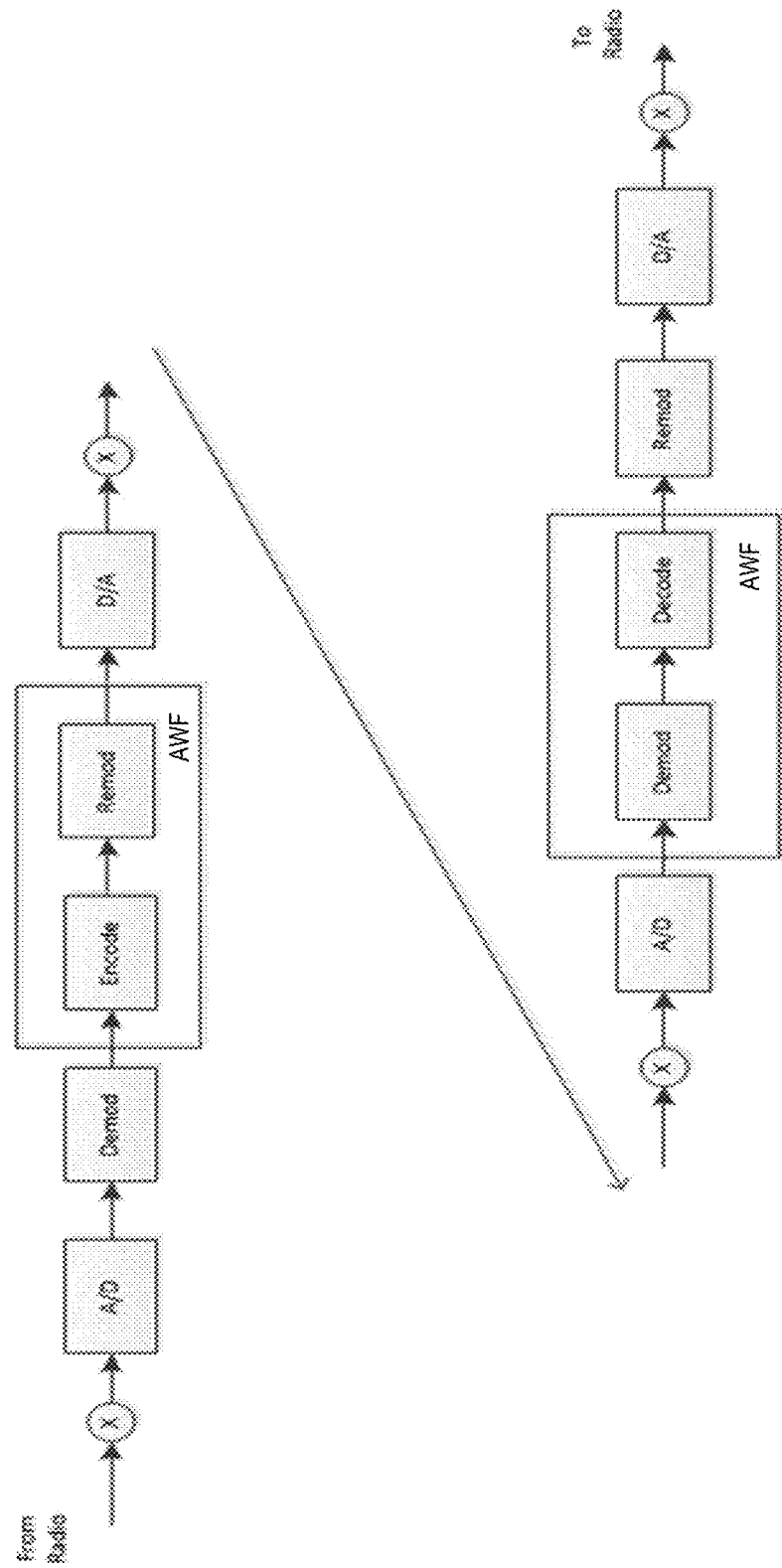
FIG. 7C depicts a high-level diagram of an example waveform encapsulation functionality implemented via a digital IF switch, in accordance with example embodiments of the present invention.
Figure 7D:
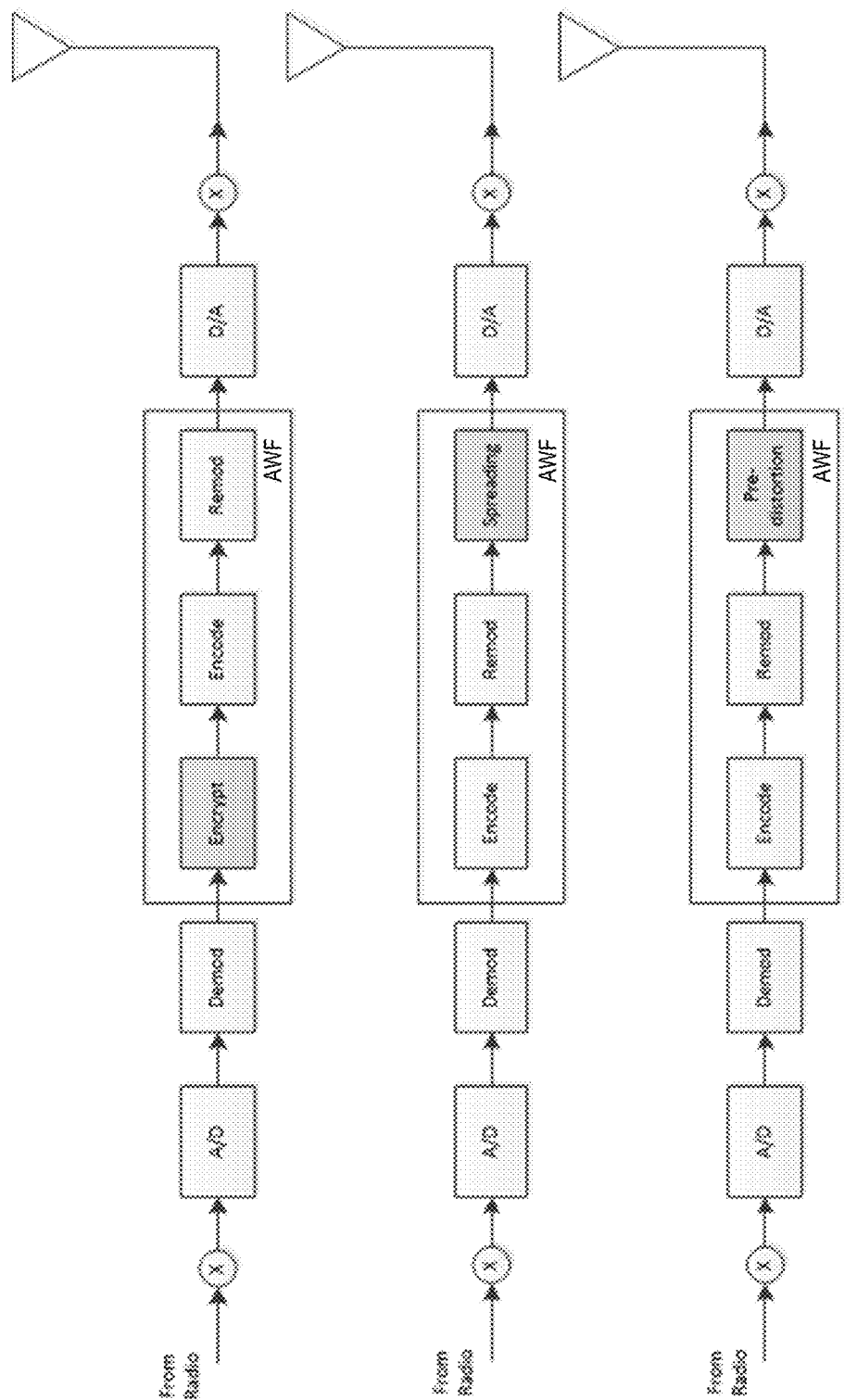
FIG. 7D depicts a high-level diagram of example encryption, spreading and predistortion features implemented via a digital IF switch, in accordance with example embodiments of the present invention.
Figure 7E:
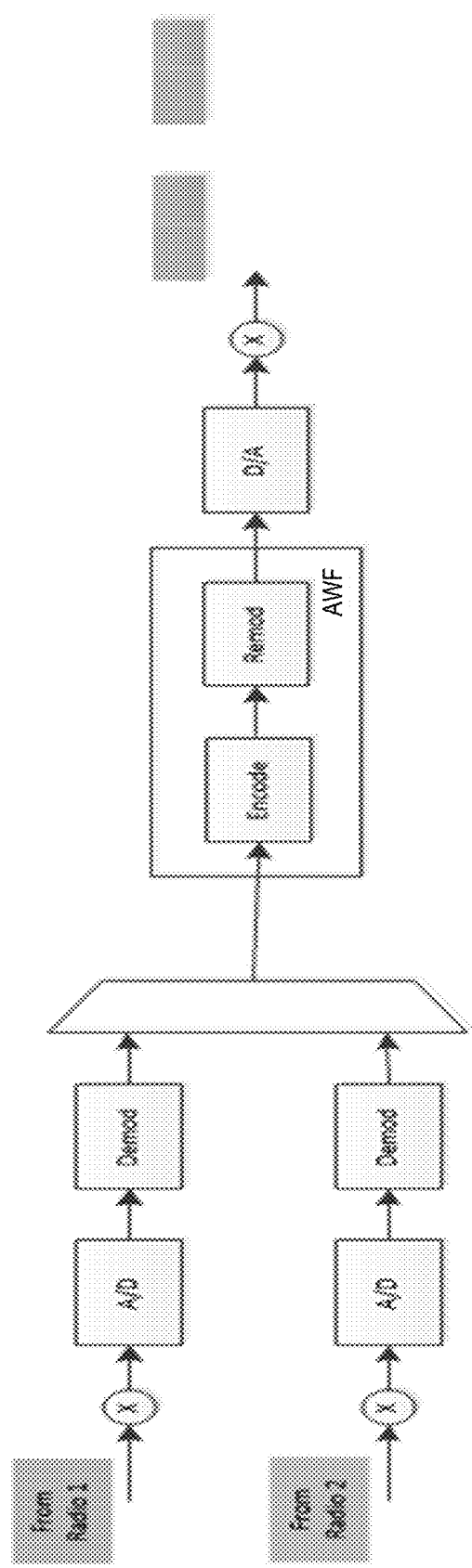
FIG. 7E depicts a high-level diagram of an example fast multiplexer/demultiplexer feature implemented via a digital IF switch, in accordance with example embodiments of the present invention.

By way of further example, as an additional enhancement, the legacy radio waveform can be encapsulated inside another waveform, such as an AWF (as referenced above). FIG. 7C depicts a high-level diagram of an example waveform encapsulation—conversion to an AWF (as referenced above)—functionality implemented via a digital IF switch, in accordance with example embodiments of the present invention. As shown in FIG. 7C, the legacy radio waveform is demodulated to recover the symbols, which are then reformatted to be transmitted as an AWF (as referenced above). The conversion is then reversed on the receiving end. FIG. 7D depicts a high-level diagram of example encryption, spreading and predistortion features implemented via a digital IF switch, in accordance with example embodiments of the present invention. As shown in FIG. 7D, other features can be included, such as encryption to enhance transactional security, spreading to operate at lower signal-to-noise ratio for resiliency against interference, and/or predistortion to promote non-linear operations of the power amplifiers. The encapsulation capability can be integrated with the switch multiplexing function as well. Rather than having the multiplexer statically select just one radio, as shown in FIG. 7E, transmissions of more than one can be sent in a time-multiplexed format—FIG. 7E depicts a high-level diagram of an example fast mux/demux feature implemented via a digital IF switch, in accordance with example embodiments of the present invention. Thus, multiple radios (such as radios operating in burst mode) can share one spectrum resource.

Figure 7F:
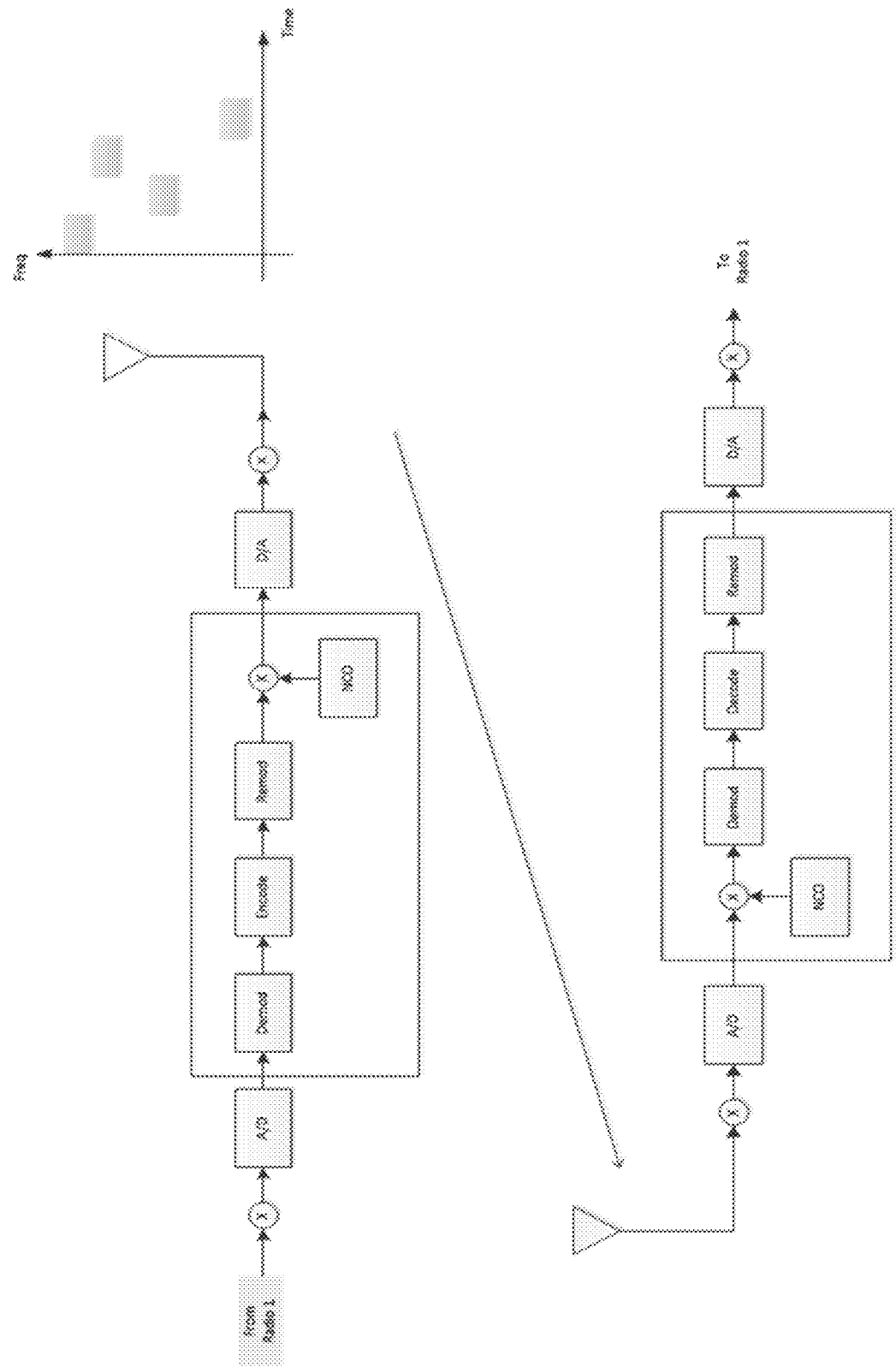
FIG. 7F depicts a high-level diagram of an example frequency hop feature implemented via a digital IF switch, in accordance with example embodiments of the present invention.
Figure 7G:
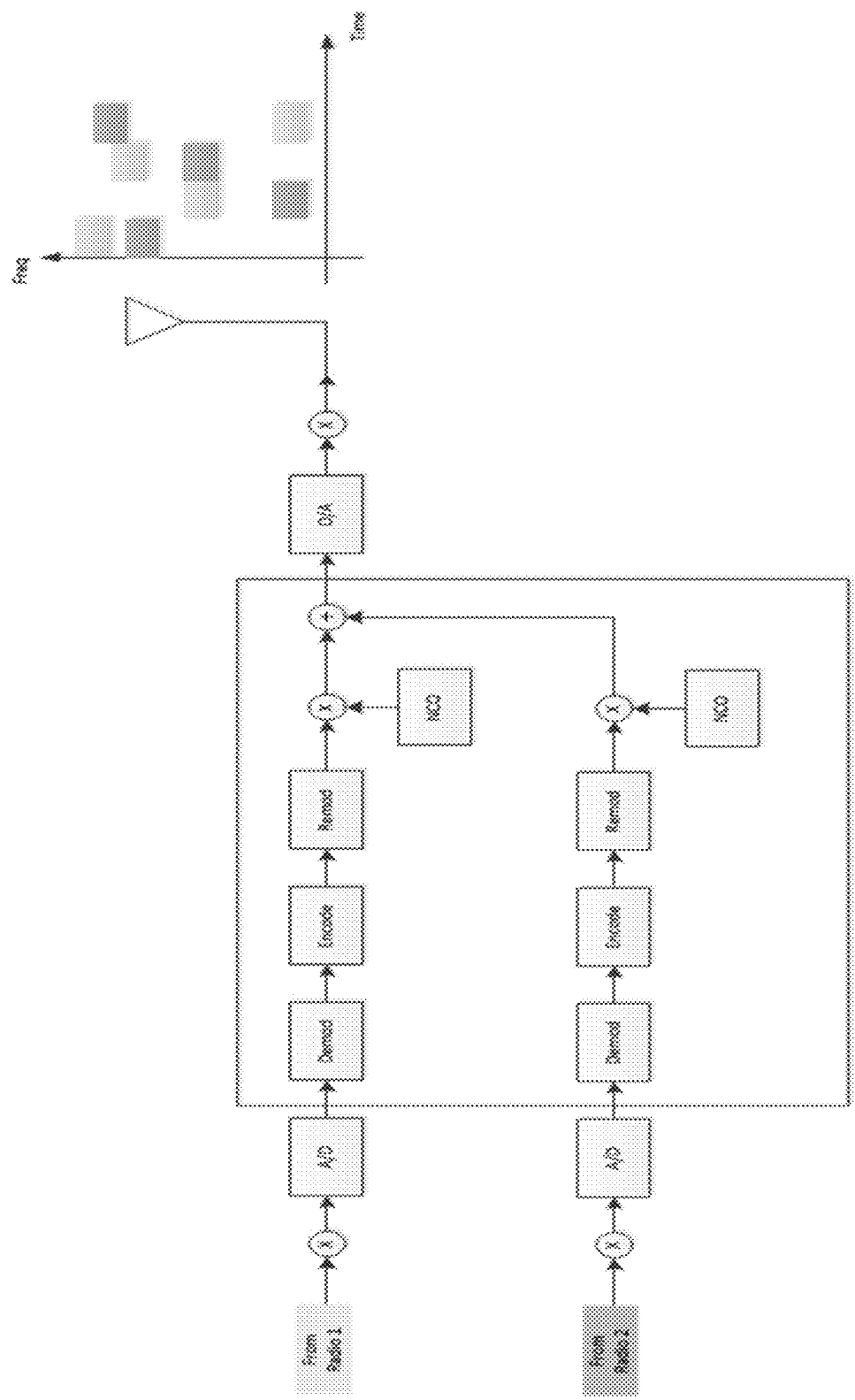
FIG. 7G depicts a high-level diagram of example multiple encapsulation transmissions, having their own frequency sequences, features implemented via a digital IF switch, in accordance with example embodiments of the present invention.
Figure 7H:
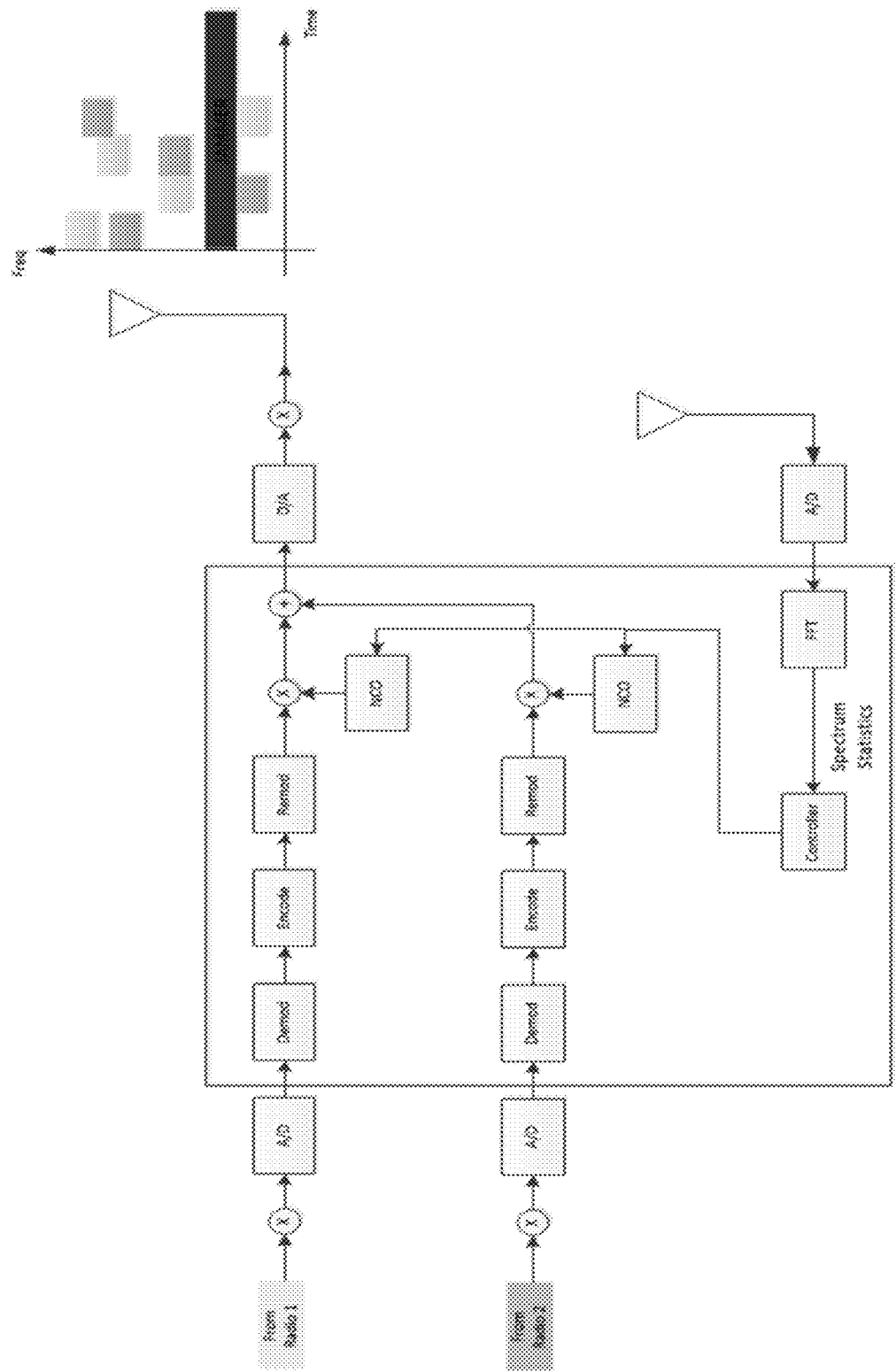
FIG. 7H depicts a high-level diagram of example hopping with spectrum sensing for interference avoidance features implemented via a digital IF switch, in accordance with example embodiments of the present invention.

By way of further example, when more spectrums are available, a frequency hopping feature can be added through a digital mixer with a numerically controlled oscillator, as shown in FIG. 7F-FIG. 7F depicts a high-level diagram of an example frequency hop feature implemented via a digital IF switch, in accordance with example embodiments of the present invention. To avoid the transmission from being intercepted, the encapsulated waveform is packetized and sent over a span of frequencies. Further, the encapsulated waveform could send multiple packets at multiple frequencies simultaneously. By way of further example, where multiple radios need to transmit, as shown in FIG. 7G, each of the encapsulated waveforms may transmit over its own frequency hopped thread—FIG. 7G depicts a high-level diagram of example multiple encapsulation transmissions, having their own frequency sequences, features implemented via a digital IF switch, in accordance with example embodiments of the present invention. The hopped frequencies across threads may also overlap among the threads at any particular time. By way of further example, when a spectrum sensor, such as with the Fast Fourier Transform is included through a second antenna, as shown in FIG. 7H, the capability of interference avoidance can adapt the hop frequency threads to omit the selection of the jammed spectrum—FIG. 7H depicts a high-level diagram of example hopping with spectrum sensing for interference avoidance features implemented via a digital IF switch, in accordance with example embodiments of the present invention.

According to example embodiments, a central network unified management system (UMS) may be based on existing commercial management software. Current commercial NOCs routinely manage a heterogeneous set of networks, with a common primary manager to manage secondary managers and customer service systems. There are a wide variety of commercial network management systems with features that can be leveraged in the UMS architecture, such as (i) full stack of business, service, network and element management, (ii) wide-beam and narrow-beam satellites (e.g., HTSs), (iii) scalability for many remote terminals (e.g., in the millions of terminals) in a single satellite system, (iv) element management for diverse transports, including bent pipe satellites, processing satellites and terrestrial communications, (v) satellite platforms in LEO, MEO and GEO orbits for narrowband and broadband applications, (vi) diverse user applications including fixed, commercial on-the-move (COTM), marine and airborne terminals, (vii) multiple network topologies, including hub and spoke, full mesh, broadcast and multicast. The architecture according to example embodiments would have a representative implementation of the GNOC, using components of commercial UMSs. Further, a global satellite resource pool manager can assist with a satellite communications service broker (e.g., with situational awareness and service-level assurance tools). This would essentially automate current manual process comprising Satellite Access Request (SAR) requirements typically used in US government satellite networks.

According to further example embodiments, the UMS has direct control of the entire flexible ST via the UMA, while the individual modems are directly managed by their respective service provider management systems. The GNOC also provides high level policies and resource allocations to service provider management systems and collects satellite link status for overall situational awareness. In addition, the GNOC also collects user network interface and modem interface performance data directly from UMA for firsthand knowledge of the ground truth. By way of example, the UMS interfaces with each management system (e.g., as shown by the dashed lines between the UMS and each of the Management System 1 and the Management System M) using an appropriate API (e.g., derived from existing commercial systems). Further, the API can be standardized to accommodate multiple commercial organizations. By way of example, the interface between the UMS and a Management System (Gateway) provides for coordination and control (by the UMS) between the resource management, network management, service management, SLA management, and situational awareness management functions of the Management System and the STs. Further, the PBNM channel (which resides in the flexible ST) interfaces the NMS of the GNOC and the UMA of the terminal. By way of example, the PBNM channel provides for the policy-based management of the ST by the UMS—the transport selection function (e.g., satellite, modem and service provider selection) of the ST.

According to such embodiments, the UMS of the GNOC includes the automation engine and a control interface to the set of commercial satellite communications systems from multiple vendors. The transport aspects of these interfaces may be common, including TCP/IP, SNMP, JSON, XML, HTTP and similar standards. While the details of the interfaces may be system-specific, the GNOC would provide a set of tools and APIs to adapt to such system-specific interfaces in a relatively straightforward manner. Further, the use of key software technologies, such as Service Oriented Architecture (SOA)-based software bus and rule-based inferencing, can facilitate integration of key functions for resource pool management, situational awareness and fault management.

According to example embodiments, the provided architectures facilitate dynamic resource management. All of the resource management primitives are supported for multiple service provider management systems and UMA policies to ensure automation during initial commissioning, and switching service providers, modems, satellites or ground transport. This uses existing software technologies for universal policy definition and analysis, network object modeling, rule implementation, automated inferencing and protocol transformation.

Figure 8:
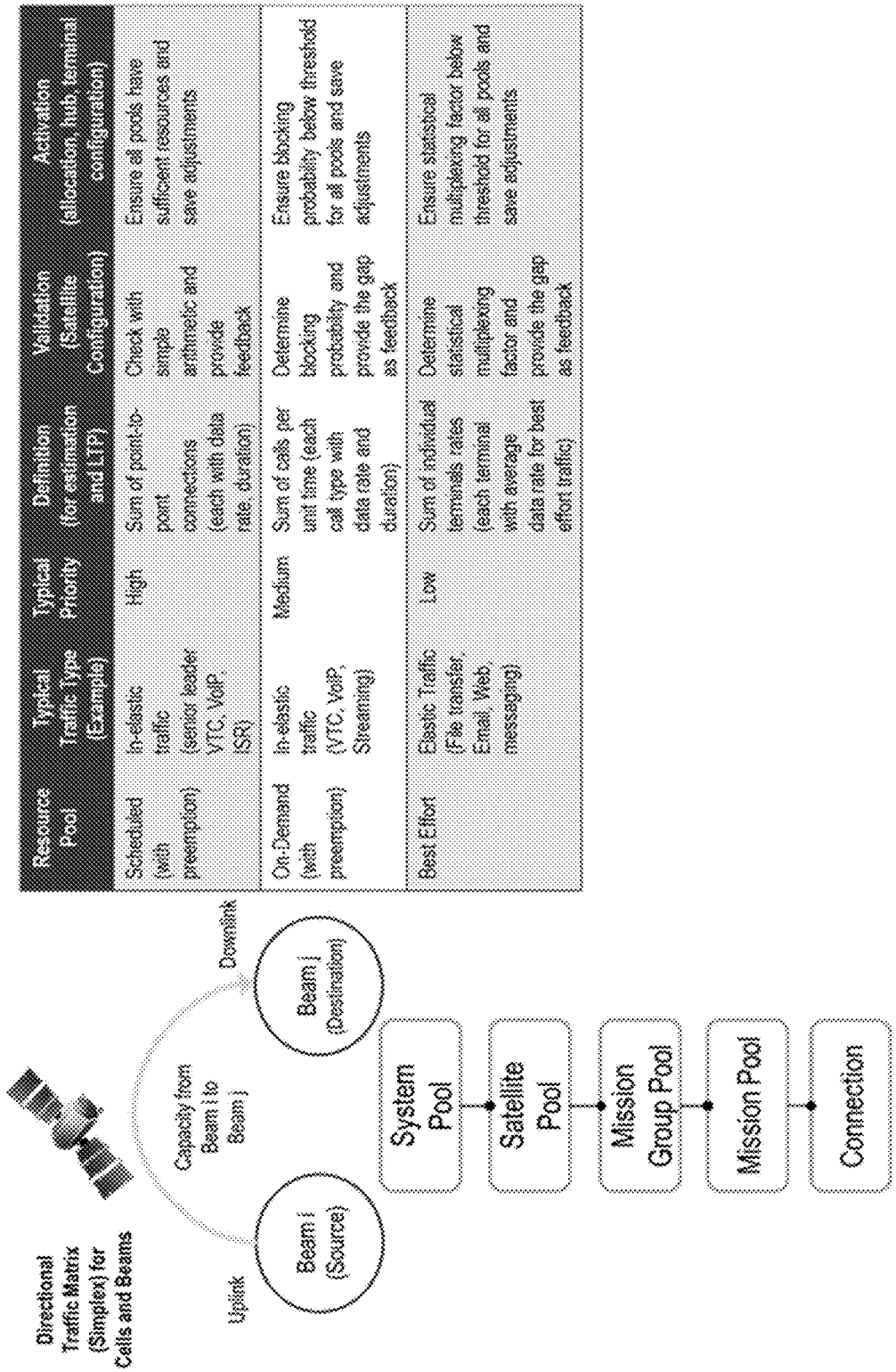
FIG. 8 illustrates an example of dynamic resource allocation and pool management for service level agreement (SLA) based satellite communications, in accordance with example embodiments of the present invention.

By way of example, FIG. 8 shows an example of a summary of dynamic resource allocation with a service provider management system using resource (satellite bandwidth) pools allocated by the GNOC—dynamic resource allocation and pool management for service level agreement (SLA) based satellite communications, in accordance with example embodiments of the present invention. The programmatic API between these management systems is used to request and assign aggregate capacity pools. Each such pool is then used by the service provider management system to allocate bandwidth to support various types of services (scheduled, on-demand, and best-effort).

According to further example embodiments, in mobile satellite communications systems, with satellite terminal mobility, as a mobile platform moves (e.g., an aircraft terminal), it transitions from beam to beam and satellite to satellite, and in the process, changes the ground gateway that is utilized for transport. Without mitigation, this would lead to the sessions being torn down and re-established with a different point of presence. This, however, can be resolved by use of a Mobility Network Access Point, where all the aero traffic is routed from the gateways, and the end user thus experiences a stable continuous session, regardless of the ground gateway in use. The selection of a beam and/or satellite can be dictated by the gateway or the terminal, based on the location of the platform, visibility of the satellite, signal strength and business considerations. In this context, the policy rule engine in the terminal can be used to implement a terminal-based mobility handover mechanism for modems and gateways that do not inherently support mobility.

According to further example embodiments, for global mobility, the satellite selection is performed by directing the ACU to move the aperture to the specific Azimuth and Elevation angles pointing to the new satellite. A modem under the control of a mobility management function of the service provider gateway and management systems will be able to perform a satellite handover. This handover can be driven by the modem or the gateway. In the worst case, pointing the antenna to a new satellite and activating the modem can trigger a typical modem commissioning process consistent with the waveform used between the modem and the corresponding gateway. At the end of the commissioning process, the modem would start exchanging data with the gateway. Any parameters, such as modem name and password required for bootstrapping the commissioning process, are already embedded in the modem. If the modem allows a local management interface, the TMA can additionally provide better control (changes) over managing the values of these parameters. This capability of the TMA is useful in expanding mobility designs for a specific modem. For example, a service provider may lack a global system over multiple satellites but may provide multiple regional systems. Each regional system may require the use of a different modem name and password. Instead of requiring an operator, the TMA can be used to select the right set of modem name and passwords based on the location of the terminal and the use of a specific satellite. To complete the circle, GNOC can keep service-level information for the terminal and provide it to the various regional management systems so that they are preconfigured to support the modem as the terminal roams into their coverage area.

Flexible Terminal Architecture Use Cases

The key objectives include (i) high-level architectural framework and management interfaces for using networks from multiple service providers, (ii) enhanced network management for integrating various satellite communications components with UMS, (iii) inclusion of Ka narrow-beam (e.g., HTS), and higher RF band systems, such as Q, V and W bands, Ku and Ka wide-beam, MEO systems, and LEO constellations to support multiple transport alternatives—e.g., ranging from leveraging commercial satellite communications services to purpose-built satellites (e.g., with on-board processing), (iv) quantitative ranges for various aspects of efficiency and resiliency (e.g., avoidance, robustness, recovery and reconstitution) within the context of affordability, (v) orders-of-magnitude improvement objectives and associated factors, (vi) SLA, including priority, QoS (delay, packet loss, data rate, etc.), efficiency, availability and resiliency, (vii) satellite transport and ground network configuration and mission parameters. Further, the following use cases incorporate these key objectives: (a) satellite communications service portability (e.g., automated provisioning and remote net-ops), including HTS satellites; (b) satellite communications efficient satellite bandwidth sharing (e.g., across diverse modem/terminal types), (c) satellite communications service resiliency (e.g., automated satellite switchover), (d) satellite communications situational awareness (e.g., inference based on data analytics).

The pilot network for validation includes (i) tactical and integrated service router (ISR) modems using microsatellite terminal modem technology, and access to associated gateway and management systems, (ii) interoperability with government and third-party satellites, (iii) ground-based interoperability simulation for non-geostationary orbit (NGSO) constellations, (iv) enterprise modem use based on DVB-S2x and access to associated gateway and management systems, (v) third-party modem and gateway/management systems to demonstrate interoperability across service providers, (vi) modems running commercial waveforms with spread-spectrum capability (for LPI/LPD and anti-jamming), including Scrambled Code Multiple Access (SCMA), (vii) cloud-based UMS hosting and operations for UMS, (viii) various fixed and mobile platforms.

Figure 9A:
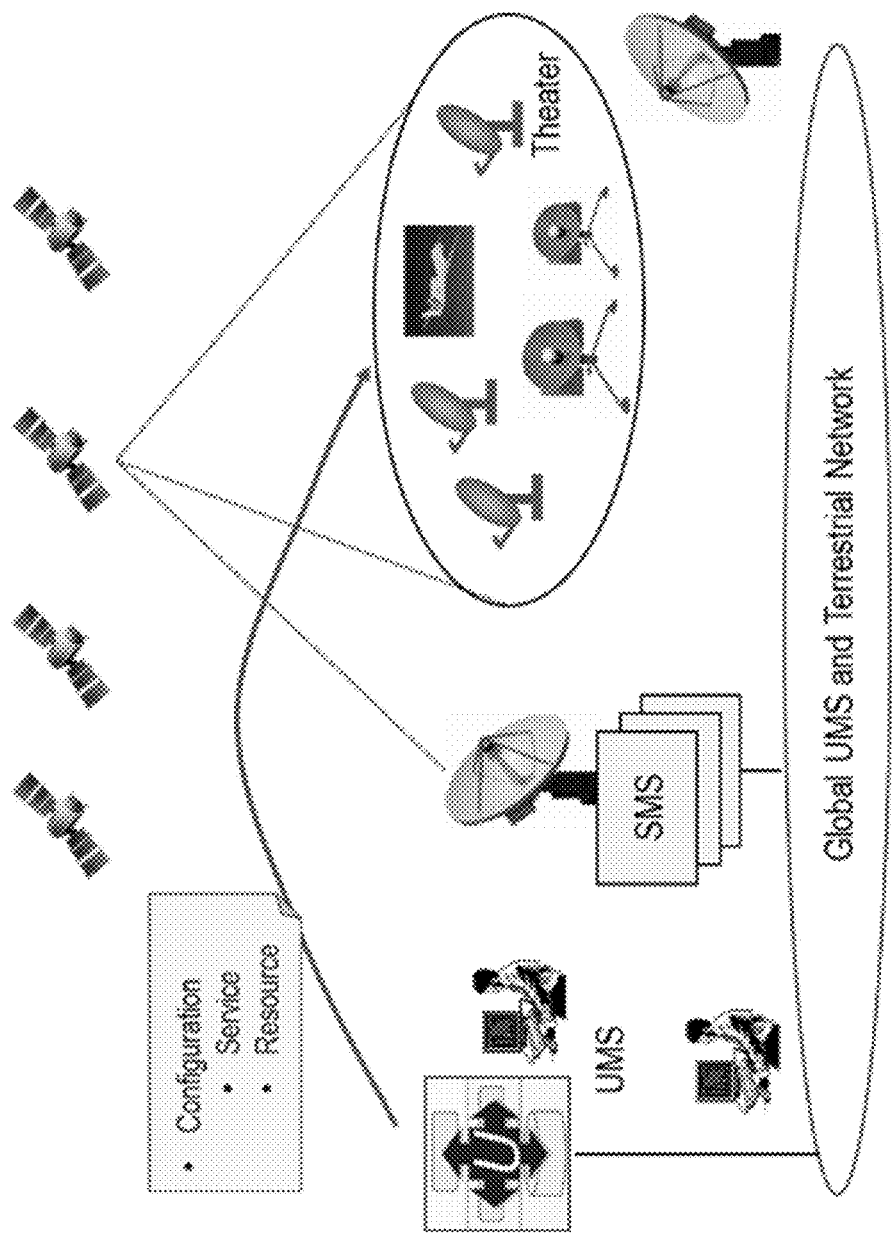
FIG. 9A shows a use case for automated provisioning and remote network-operations capabilities of the flexible ST, in accordance with example embodiments of the present invention.

By way of example, regarding satellite service portability, FIG. 9A and the following table show a use case for automated provisioning and remote network-operations capabilities of the flexible ST, in accordance with example embodiments.

| Phase | Capabilities |
| --- | --- |
| Prior To Deployment | satellite communications services created in UMS<br>User data service<br>Priority<br>Accessible satellites |
| Post Deployment | Terminal is pointed to satellite automatically with tracking antenna.<br>Responsible gateway (via service provider's MS) identifies the terminal.<br>Automatically downloads RF (and other) configuration parameters (from SMS) to terminal (if needed), which are already adjusted for specific satellite in use.<br>Satellite communications service available for mission use |
| Operations | All net-ops support is provided via UMS, and also remote access to UMS is available, for example, over satellite communications. |

Figure 9B:
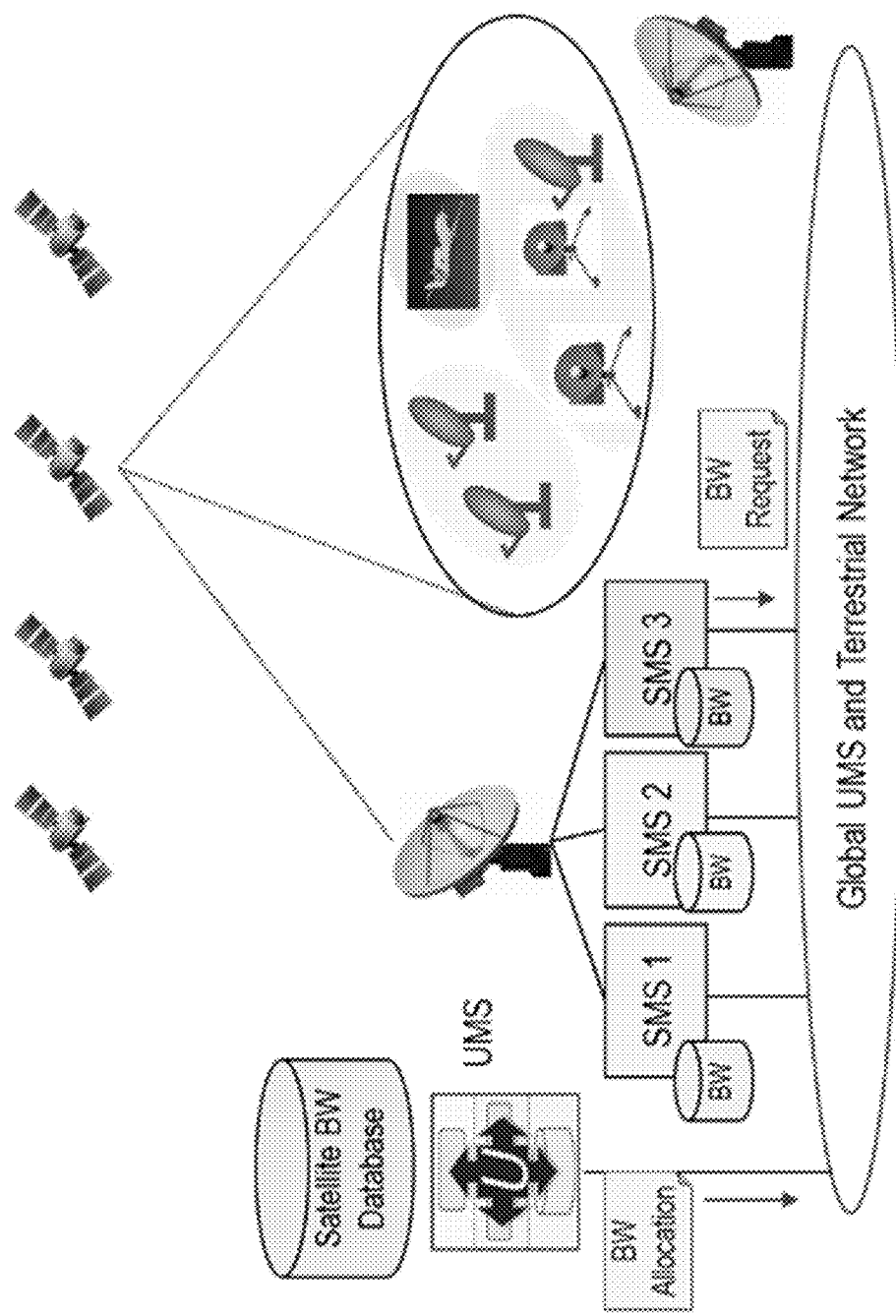
FIG. 9B shows a use case for bandwidth sharing and assurance across diverse modem/terminal types and service providers, in accordance with example embodiments of the present invention.

By way of further example, regarding satellite bandwidth sharing, FIG. 9B and the following table show a use case for bandwidth sharing and assurance across diverse modem/terminal types and service providers, in accordance with example embodiments.

| Phase | Capabilities |
| --- | --- |
| Prior To Deployment | Satellite bandwidth database provisioned for various networks in UMS<br>Location and time<br>Satellites<br>BW pool size<br>Priority<br>Bandwidth tentatively allocated to individual SMS. |
| Post Deployment | Based on traffic SMS requests for satellite bandwidth - priority-based arbitration.<br>A bigger shared pool at UMS ensures high allocation rate - priority-based preemption to guarantee bandwidth for high priority mission. |
| Operations | Bandwidth allocation policies and manual adjustments performed in UMS.<br>Big data analytics at UMS can better size all BW pools. |

Figure 9C:
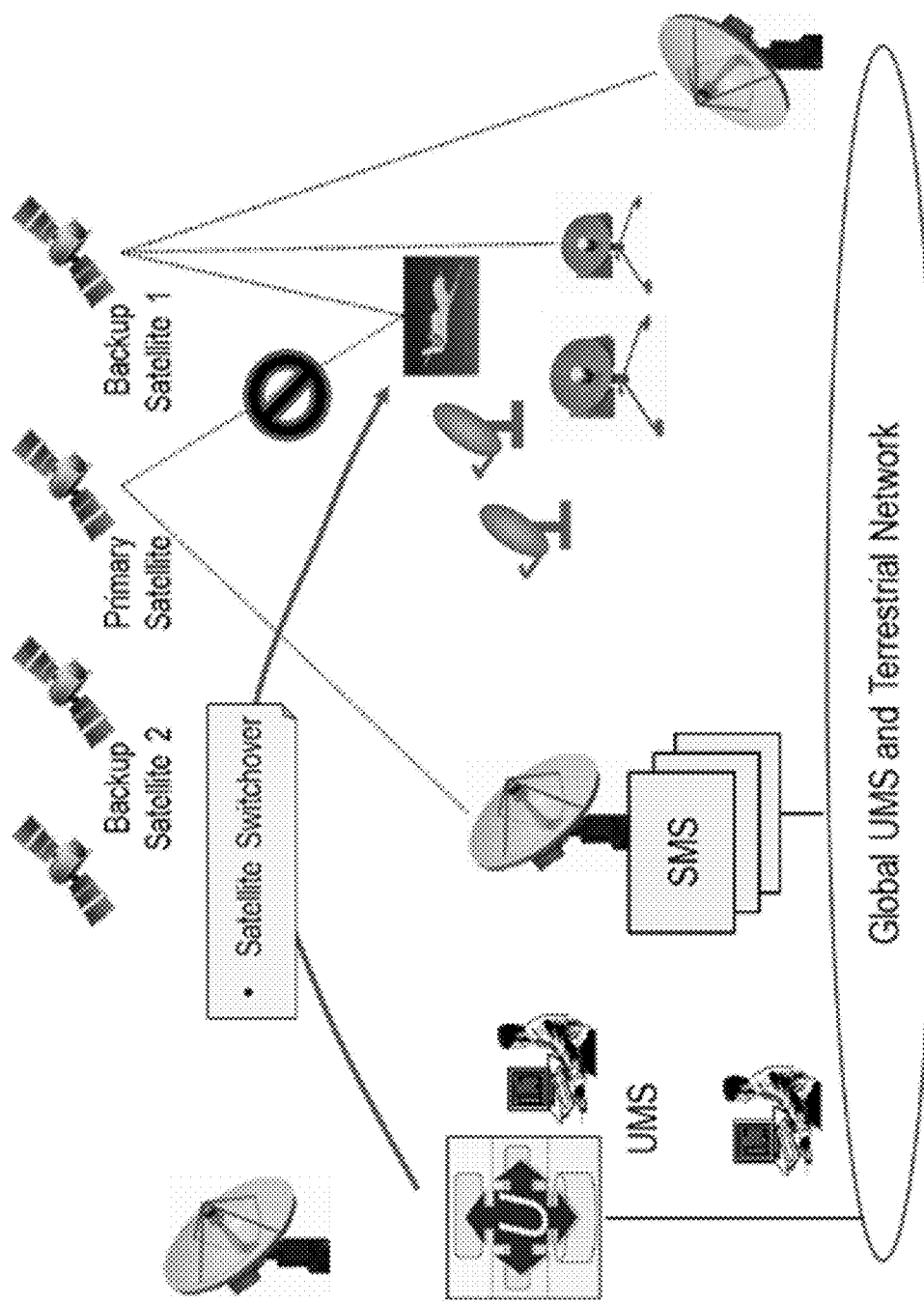
FIG. 9C shows a use case for resiliency with automated satellite switchover, according to example embodiments of the present invention.

By way of further example, regarding satellite communications resiliency FIG. 9C and the following table show a use case for resiliency with automated satellite switchover, according to example embodiments.

| Phase | Capabilities |
| --- | --- |
| Prior To Deployment | Satellite communications services created in UMS.<br>Multiple accessible satellites configured for high-priority terminals - e.g., based on location. |
| Post Deployment | Terminal uses the primary satellite under normal operation.<br>Terminal (decided by UMA) automatically switches to another satellite because of:<br>Mobility of terminal<br>Adverse cyber conditions<br>Capacity limits on primary satellite<br>Adverse situations, such as jamming of primary satellite<br>Fixed terminals can be manually repointed - no other configuration changes. |
| Operations | UMS tracks all terminals, priorities, and satellite operational environment.<br>Supports optimal satellite/beam switchover. |

Figure 9D:
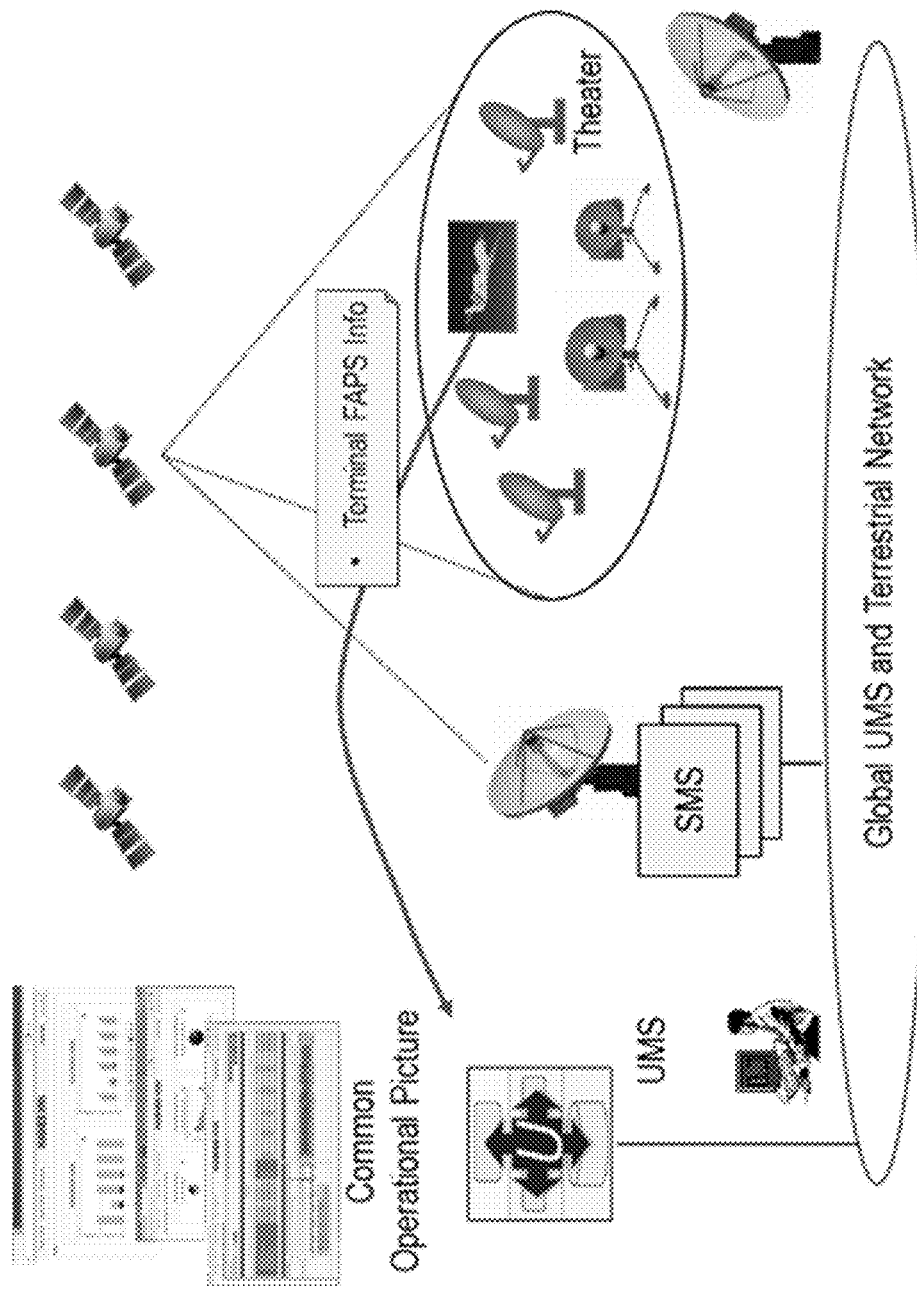
FIG. 9D shows a use case for situational awareness with inferences based on data analytics and big data techniques, in accordance with example embodiments of the present invention.

By way of further example, regarding satellite communications situational awareness, FIG. 9D and the following table show a use case for situational awareness with inferences based on data analytics and big data techniques, in accordance with example embodiments.

| System | Capabilities |
| --- | --- |
| Modems | Collect fault, usage, performance and security information.<br>Send FAPS information to respective SMS |
| SMS | Forward all terminal FAPS data to UMS.<br>Provides aggregate/summarized information to UMS - e.g., modem group level and service type level. |
| UMS | Use big data techniques to analyze information, such as:<br>Summarization<br>Correlation<br>Filtering<br>Inferencing<br>Update resource configurations to optimize service delivery<br>Updated information sent to EMS (and terminal)<br>Provide Common Operational Picture (COP) across all satellite communications terminals<br>Globally accessible GUI |

According to further example embodiments, regarding security functions, the flexible ST architecture can be enhanced in the management plane (across management systems of the service providers and customer) to meet particular customer security requirements.

Commercial satellite terminals and hubs collect SNR information for uplink and downlink. Use of intra-network SNR information and specialized equipment (mostly at hub locations) for detecting unwarranted noise can be detected in seconds to minutes. This information can be used by UMA to make decisions about satellite selection. For example, location of a jammer can take hours to days, based on the type of jamming, mobility of jammer and access to the wider area where the jammer may potentially be located. This longer-term information can be used by the GNOC in defining policies for the UMA.

Commercial satellite communications services provide IP/Ethernet-level access to satellite-based data transport (e.g., enabled by the combination of satellites, hubs/gateways, backhaul links, terminals and network management systems). Such a satellite communications service is associated with service level agreements (SLA), including priority, QoS, efficiency and price. Resiliency against jamming would need to be added to the SLAs. More robust use of diversity and redundancy could be employed for such enhanced commercial services for a customer. SLAs can also specify redundancy to deal with penetration of ground equipment (e.g., hubs or gateways). The commercial industry can work with a specific customer to define SLAs for the commercial satellite communications services with enhancements against jamming and penetration. Additionally, the commercial industry can explore potential arrangements where commercial gateways can be deployed at customer teleport sites.

Commercial satellite communications solutions interoperate with end-to-end encryption (such as IPsec) to protect critical user information. Some satellite communications systems require information, such as location of a terminal and user identifying information, in making control and management plane decisions that are encrypted (e.g., if transmitted over the air). Control plane signaling is also protected against signal analysis in some commercial systems. Commercial industry can work with a customer to analyze over-the-air the use of system-critical information and ensure that either they are not used over the air or they are all protected at the right level.

As described above, commercial satellite communications systems collect SNR information from both networks (terminals and hubs), that can be processed with data analytics software to identify interference. Gateways are also typically equipped with ancillary equipment that focuses on detecting interference and locating their potential sources. Some of the geo-location work is also outsourced to third parties that specialize in such work. RF interference service providers, with extensive satellite communications and other infrastructure deployed worldwide, can play a unique role in identifying interference in various bands and providing additional information to commercial industry. Government customers and industry consortia (similar to space situational awareness) can support commercial satellite communications industry alliance with specific information to service providers with the presence and geo-location of jammers (e.g., for OCONUS and/or terminals deployed for customer networks). The collection, analysis and reporting of interference data can be added as a feature for the GNOC using the UMS rule-based engine and data analytics capability.

Resiliency and high availability both use some common technical solutions in detecting adverse situations and switching in redundant hardware and software units. Resiliency requires a higher level of diversity and redundancy to better deal with malicious and carefully planned adversaries (e.g., persistent jamming).

The commercial industry provides critical communications services to government customers, which involve both redundancy and diversity (e.g., satellite transport and ground transport). It also provides very high availability satellite networks to enterprise customers with redundancies in both ground and space segments. These commercial solutions, however, are primarily aimed to deal with emergencies and hardware/software failures. More diversity and redundancy in both space and ground segments are required to better address advanced persistent threats in the various domains. The commercial industry can work with a specific customer to define specific availability and resiliency requirements within a cost framework, and the architecture would provide validation of proposed concepts.

Commercial technology is used today to automatically provide the best satellite link to high-priority terminals in the coverage areas of multiple satellites. For example, commercial airliners with satellite terminals use multiple satellites for flights between the two US coasts. Terminals with tracking antennas can automatically repoint to a different satellite, while terminals with fixed antennas will require manual repointing (some commercial fixed antennas can be repointed within 10 minutes). Business arrangements for ensuring on-demand access to multiple satellites are a prerequisite for deploying commercial solutions.

Commercial satellite systems for North America and many other locations utilize unmanned "lights-off" gateways throughout the area, optimizing gateway bandwidth utilization and terrestrial connectivity. These gateways are operated from centralized NOCs (similar to the GNOC). The use of unmanned gateways and centralized network operations allows for efficient network operations, with a minimum of staffing and maximum responsiveness to any emerging issues. The use of state-of-the-art network management software, as shown below, facilitates the use of centralized network management for a large commercial satellite communications system.

In addition to the commercial volume produced HTS Ka-band and Ku-band MF-TDMA terminals, there are several other modems and services specifically optimized for challenging environments. For example, the use of a specifically designed scramble coded multiple access (SCMA) waveform (e.g., as described in the U.S. Patent Publication Nos. US9461765B2, US8683292B2, US8619974B2) alone or in combination with microsatellite terminal modems (e.g., using a microsat waveform for small terminal applications, such as described in the U.S. Patent Publication No. US9203431B2), may facilitate such services as single carrier per carrier (SCPC) and demand assigned multiple access (DAMA) services, and uses high rates of coding for performance with small antennas able to operate under the noise floor and also includes special features to enable use through helicopter blades. Such an SCMA waveform, available on small form-factor hardware and ready for multiple bands, could also be used to implement a separate "management" radio channel for this architecture.

Example Implementation Considerations for the Flexible Terminal Architecture

The UMA can support several commercial modems, including from a single service provider. By way of example, the UMA uses standards, such as Ethernet and L-band IFL interface, which make it compatible with modems supporting a multitude of waveforms (e.g., government and commercial/enterprise) with wider potential applications for flexible networking (e.g., for enterprise and government networks). The UMA enables full and direct control of the entire terminal, its user interfaces and modems by the GNOC.

The UMA provided architecture concepts are thus valid and consistent with the prevalent industry trends and commercial satellite system architectures. Further, in order to facilitate the usage of multiple modems in a heterogeneous architecture, a more universal approach may also be applied. For example, rather than a traditional "backplane," the use of a 1U rack-mounted modem can enhance interoperability. Further, the application of a common industry standard could simplify the interfaces, not limiting procurement to modems that satisfy a particular backplane architecture.

According to example embodiments, with the provided architectures and approach, "multi-modem backplane" functions could be provided, including the modem controller function, which could be accomplished using a 1U general-purpose computing platform. By way of example, the interfaces to the modem cards or 1U rack-mounted units may be as follows:

IF receive and transmit interfaces to the RF equipment would be most flexible with the use of L-band (950-2100 MHz). The interface could use TNC connectors.

The modem Radio Frequency Terminal (RFT) interfaces could all be standard linear interfaces in order to support the multi-modem architecture (proprietary interfaces, such as saturated IF interfaces, would reduce flexibility).

The use of Ethernet and IP for user data networks would ensure interoperability across various applications and architectures. This interface could use GigE interfaces, RJ45 for teleport equipment, MIL style connectors for airborne installations.

The use of Ethernet for modem control—either the same physical port as data (with virtual LAN for logical data separation), or a separate hardware port—would leverage existing control architectures.

Optionally, a 10 MHz input for timing and synchronization may be employed—for most modem systems, this would not be strictly necessary, as timing is obtained from the network, obviating the need for high-performance local references. This interface could use BNC connectors for teleport installations and SMA/TNC for airborne applications.

By way of further example, the UMA chassis/rack could also include a LAN switch and optionally a router for finer subnetwork control, depending on how the data will be routed to different modems. Further, for convenience, the UMA rack could also include the GPS device and IF splitters and combiners as needed, making for a compact but complete system. The use of multicore, general purpose processors, equipped with virtual machine (VM) software layer, can be used to consolidate multiple software-implemented functions, such as routing, switching, and control on common 1U hardware.

According to further example embodiments, as mentioned above, commercial rack-mounted modems could operate unmodified in a rack-mounted wideband terminal configuration, where terminals/modems include the IF interfaces and data interfaces (e.g., Ethernet/IP interfaces), as required. Alternatively, instead of the rack-mounted option, the core processing modules may be available as bare boards, in conjunction with an existing interface board. Such board sets would include the IF connections, Ethernet ports and everything else for operation. Such boards (e.g., Software Defined Modems (SDMs)) have been integrated into various platforms. Further, the OpenAMIP+would be a candidate interface (API) for control, whereas other specific interfaces might be required for other types of missions or antennas that might not be covered by that protocol.

Commercial satellite communications modems are highly controllable for their satellite transport features, both locally via a web-based interface and remotely via the network system controllers. This includes the selection of initial channels for operation as well as various modulation and coding schemes (MODCODs) for radio-channel-specific performance optimization. Power control can be performed by the network either automatically or manually (e.g., UAS mostly requires manual power control). Various parameters at radio physical layer, data link layer and network layer may be configurable from the NMS. Some parameters can be dynamically controlled, such as routing in the network layer and MODCOD selection under Adaptive Coding and Modulation (ACM). Modem and antenna control units may work within a control loop and share information for satellite tracking using either the OpenAMIP interface or other proprietary interfaces (e.g., Inmarsat GX, General Atomics Predator, NGC Triton).

By way of example, for typical modem families, the interfaces include (i) AC or DC power, depending on packaging and installation requirements, where AC is generally 110-240 V 50-60 Hz, and DC is generally 10-36 V, (ii) Ethernet (RJ45) or MIL-specific connectors, (iii) L-band IF interfaces using TNC or F-Type connectors—IF range may be 950-2100 MHz, MIL-STD-188-164 compliant, (iv) 10 MHz input/output clock references or separate connectors or on the IFL (interfacility) interfaces.

With regard to antenna control, by way of example, in the UMA architecture, the modem controller computer would manage the antenna, which would allow for full flexibility and high-level control of the antenna, while reducing any dependence on control interfaces within the modems. For example, many commercial modems do support the OpenAMIP standard for antenna interoperability, if required. As mentioned above, other standards of interest include ARINC on the ARINC 791 standard to ensure compatibility with that architecture. The modems may also support serial and Ethernet interfaces for antenna control if required.

Commercial modems are simple to install and configure. Commercial providers take the approach of putting complexity at the gateway (hub) where there is much processing power and many experienced satellite operators and make the terminals as simple to commission as possible. These modems go through an automated commissioning process during their first use. This normally involves antenna pointing (the modem provides feedback to assist with pointing), and confirmation of service eligibility. Once this is done, the terminal goes through an automatic "ranging" process, where satellite delays specific to the location, and available MODCODs are determined. After authentication by the hub, a terminal/modem automatically downloads all configuration parameters and software, if needed, from the hub.

Modern commercial modems have already integrated their modems with multiple commercial on-the-move (COTM) terminals, including GD Satcom, Cobham, Thinkom, L3-Datron, DRS, Tecom, Rantec, Rockwell Collins, and Raysat. Actual selection of a specific tracking antenna involves tradeoffs with each of these terminals during the working group sessions or the industry one-on-ones. Each of these terminals has its merits, and trade-offs must be made when selecting which one to use. Selection is based on mission requirements, platform dynamics, SWAP, etc. Further, since the UMA includes the RFT, the L-band interface of the modem should allow operation in any band, including X, Ku and Ka, where the gateways and satellites offer service. The provided architecture can also support multiband terminals (for example, Ku and Ka), which can provide more flexibility with respect to satellite (narrow- and wideband) selection. They include wide range RF elements (amplifiers, block convertors) or multiple RF elements, each tuned for a spectral band. Both of these modems use Ethernet and IP for user data networks and OpenAMIP for antenna integration.

Management and Networking Infrastructure

The interface to the Internet and government networks could be modeled after the enterprise connectivity. With the use of standards-based routing, switching and encrypting devices (IP-based), data and control plane integration risk can be significantly reduced. Management layer integration will require specific capabilities in the GNOC. Further, one option would be for all commercial satellite communications data to be routed through a single point of presence. The advantage of this is that, from an external user perspective, a single session is initiated and maintained, even if the service provider is changed.

Further end-to-end encryption can be employed providing the advantage of allowing for highly sensitive data to be carried over open networks. In commercial systems Virtual Private Networks (VPNs) are used to allow secure use of open networks (such as airport Wi-Fi systems), to protect individual data, such as bank account details, and company data, such as proprietary documents. For government networks, COMSEC devices, such as HAIPE, are used to encrypt IP packets. Commercial products are compatible with HAIPE. Commercial providers have tested its network architectures successfully with various HAIPE devices (KG250, KG175) and other crypto devices, including US and other countries.

One drawback of end-to-end encryption, however, especially in satellite networks, is that it can defeat some Performance Enhancing Proxies (PEPs) that use knowledge of the transported data types to improve system performance. Vendors have provided customers with complete end-to-end solutions, including PEP solutions that sit behind the IP encrypters in order to provide the appropriate WAN acceleration and spoofing to TCP traffic. Commercial providers have also successfully deployed tactical networks supporting end-to-end QoS from red to red networks through multiple transports by using the various IP prioritization features available in commercial product lines. Some HAIPE devices allow the use of DSCP fields from user IP packets to be copied into outer headers where they are available for user traffic differentiation and prioritization as needed. The provided approaches take advantage of this features in order to provide the complete solution, which includes careful alignment of priority queues and settings with each hop and route.

Even though the data may be secured using end-to-end encryption, sometimes certain data can be inferred from the patterns of data use (such as increased usage prior to the commencement of some operation). Also, sometimes the metadata in setting up, and keeping up connections are sent "in the clear" —in that case, even though the actual data is protected, a lot of information can be inferred from analyzing the metadata. Transport Security (TRANSEC) may be employed to mitigate this by disguising the system data usage.

The ground infrastructure can also be used to enhance TRANSEC, for example, filling the terrestrial links with dummy data so that actual data could not be isolated. The dummy data would also be encrypted so that it cannot be recognized as dummy. The UMA provides the opportunity to accommodate these specialized modems as they become commercially available at lower costs. Spread spectrum, with direct sequence or frequency hopping techniques, can be used to protect against partial or full band jamming. Commercial and government waveforms and modems exist that support such anti-jamming feature and with L-band IF interface can be supported by the UMA.

Network Control for Mission Assurance

The GNOC serves as a primary element of the control architecture and provides the overall orchestration for use of specific satellites, service providers and resource pools. The GNOC provides specific policies to element/network management systems of respective service providers for more detailed and fine-grained control of modems and hubs in their respective management domains. Features, such as resource pool management, automated commissioning, satellite/beam handover and SLA management can be extended to meet the needs of the GNOC. Commercial NMSs can also provide APIs for both southbound and northbound integration with other systems.

The UMS may include a run-time configurable automation infrastructure coupled with adaptable control interfaces to the set of commercial satellite communications systems from multiple service providers (vendors). The transport aspects of these interfaces may be common, including TCP/IP, SNMP, JSON, HTTP and similar standards. The details of the interfaces may be system specific, but the GNOC would provide a set of automation tools and APIs to adapt to these interfaces.

Further, in the case of accessing the proprietary aspects of different platforms, while most vendors will publish interface control documents (ICDs) for these functions, others may choose not to publish. In that case, the GNOC can be provided with a generic ICD (e.g., using SNMP, JSON/HTTP, XML/HTTP, etc.), and the commercial vendors can develop respective adaptation functions to marry their proprietary platform technologies with the generic ICD of the GNOC. Further, a homogeneous SLA can be provided across all competing systems via an appropriate SLA with descriptions of what service to expect when roaming into each respective service area.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   monitoring, by a control module of a wireless communications terminal, one or more factors that indicate operational characteristics of data communications via a first data path between the wireless communications terminal and a remote gateway node over a first network of a plurality of available wireless data communications networks;
   determining, by the control module of the wireless communications terminal, that the data communications via the first data path are affected by one or more conditions, based on a determination that at least one of the one or more factors satisfies a respective predetermined state of the first data path, wherein each predetermined state reflects at least one of the one or more conditions affecting the data communications via the first data path;
   determining, by the control module of the wireless communications terminal, a second data path for the data communications between the wireless communications terminal and the remote gateway node over a second network of the plurality of available wireless data communications networks, wherein the second data path is not affected by the one or more conditions affecting the first data path; and determining, by the control module of the wireless communications terminal, to switch the data communications between the wireless communications terminal and the remote gateway node from the first data path to the second data path; and wherein the determination to switch the data communications from the first data path to the second data path is based on an evaluation of one or more policy-based rules applicable to the data communications in view of the one or more conditions, and wherein the policy-based rules are controlled by a unified network management system based on a global view of the plurality of available wireless communications networks and overall objectives of respective service providers operating the plurality of available wireless data communications networks and optimization considerations for the plurality of available wireless data communications networks.

2. The method according to claim 1, wherein the wireless communications terminal utilizes a first modem for the first data path and utilizes a second modem for the second data path, and wherein the switching from the first data path to the second data path comprises switching from the first modem to the second modem.

3. The method according to claim 2, wherein the first modem is configured to communicate with a first satellite for the first data path over the first network, and the second modem is configured to communicate with a second satellite for the second data path over the second network.

4. The method according to claim 1, wherein an operational data path of the wireless communications terminal is configured to communicate with a first satellite of the wireless communications network utilizing a first modem of the wireless communications terminal for the first data path, and wherein the switching from the first data path to the second data path comprises switching the operational data path from the first modem to a second modem of the wireless communications terminal, and configuring the operational data path to communicate with a second satellite of the wireless communications network utilizing the second modem of the wireless communications terminal for the second data path.

5. The method according to claim 1 wherein inputs considered in the evaluation of the one or more policy-based rules comprise one or more of identification of one or more permitted satellites, identification of one or more approved service providers, identification of one or more appropriate transport services for the data communications, cyber state of one or more modems of the wireless communications terminal, radio frequency (RF) state of one or more links associated with respective satellites, time of day, a respective priority of each rule, a start time for each rule, and an end time for each rule.

6. The method according to claim 1, further comprising:
receiving, by the control module of the wireless communications terminal, one or more external factors related to the first data path, wherein the one or more external factors are received from a remote node of the wireless data communications network located remotely from the wireless communications terminal; and
wherein the determination that the first data path is affected by the one or more conditions comprises determining that at least one of the one or more external factors satisfies a respective predetermined state, wherein each predetermined state reflects at least one of the one or more conditions affecting the first data path.

7. A wireless communications terminal comprising:
a control processor configured to (i) monitor one or more factors that indicate operational characteristics of data communications via a first data path between the wireless communications terminal and a remote gateway node over a first network of a plurality of available wireless data communications networks, (ii) determine that the data communications via the first data path are affected by one or more conditions, based on a determination that at least one of the one or more factors satisfies a respective predetermined state of the first data path, wherein each predetermined state reflects at least one of the one or more conditions affecting the data communications via the first data path, (iii) determine a second data path for the data communications between the wireless communications terminal and the remote gateway node over a second network of the plurality of available wireless data communications networks, wherein the second data path is not affected by the one or more conditions affecting the first data path, and (iv) determine to switch the data communications between the wireless communications terminal and the remote gateway node from the first data path to the second data path; and
wherein the determination to switch the data communications from the first data path to the second data path is based on an evaluation of one or more policy-based rules applicable to the data communications in view of the one or more conditions, and
wherein the policy-based rules are controlled by a unified network management system based on a global view of the plurality of available wireless communications networks and overall objectives of respective service providers operating the plurality of available wireless data communications networks and optimization considerations for the plurality of available wireless data communications networks.

8. The wireless communications terminal according to claim 7, further comprising:
a first modem configured to facilitate the one or more of the transmission and reception of the data communications via the first data path; and
a second modem configured to facilitate the one or more of the transmission and reception of the data communications via the second data path; and
wherein the switching from the first data path to the second data path comprises switching from the first modem to the second modem.

9. The wireless communications terminal according to claim 8, wherein the first modem is configured to communicate with a first satellite for the first data path over the first network, and the second modem is configured to communicate with a second satellite for the second data path over the second network.

10. The wireless communications terminal according to claim 7, further comprising:
a first modem; and
a second modem; and
wherein the control processor is further configured to control an operational data path of the wireless communications terminal to communicate with a first satellite of the wireless communications network utilizing the first modem for the first data path, and wherein the control processor is configured to switch from the first data path to the second data path by switching the operational data path from the first modem to the second modem and configuring the operational data path to communicate with a second satellite of the wireless communications network utilizing the second modem for the second data path.

11. The wireless communications terminal according to claim 7, wherein inputs considered in the evaluation of the one or more policy-based rules comprise one or more of identification of one or more permitted satellites, identification of one or more approved service providers, identification of one or more appropriate transport services for the data communications, cyber state of one or more modems of the wireless communications terminal, radio frequency (RF) state of one or more links associated with respective satellites, time of day, a respective priority of each rule, a start time for each rule, and an end time for each rule.

12. The wireless communications terminal according to claim 7, wherein the control processor is further configured to receive one or more external factors related to the first data path, wherein the one or more external factors are received from a remote node of the wireless data communications network located remotely from the wireless communications terminal, wherein the determination that the first data path is affected by the one or more conditions comprises determining that at least one of the one or more external factors satisfies a respective predetermined state, wherein each predetermined state reflects at least one of the one or more conditions affecting the first data path.

13. The wireless communications terminal according to claim 10, further comprising:
a digital intermediate frequency (IF) switch connected to the first and second modems, wherein the digital IF switch is configured to perform a component function of the switching of the operational data path from the first modem to the second modem under control of the control processor.

14. The wireless communications terminal according to claim 10, further comprising:
a packet switch connected to the first and second modems, wherein the packet switch is configured to perform a component function of the switching of the operational data path from the first modem to the second modem under control of the control processor.

15. The wireless communications terminal according to claim 10, further comprising:
an antenna; and
an antenna controller connected to the antenna; and
wherein the antenna controller is configured to control the antenna to switch from pointing to the first satellite to pointing to the second satellite, under control of the control processor.

16. The wireless communications terminal according to claim 10, further comprising:
a data network interface;
a packet switch;
a digital intermediate frequency (IF) switch; and
a radio frequency transmitter/receiver; and
wherein the packet switch is connected between each of the first and second modems and the data network interface, and, as a function of the switch from the first data path to the second data path, the packet switch is configured to switch the data network interface from the first modem to the second modem, under control of the control processor, and wherein the digital IF switch is connected between each of the first and second modems and the radio frequency transmitter/receiver, and, as a function of the switch from the first data path to the second data path, the digital IF switch is configured to switch the radio frequency transmitter/receiver from the first modem to the second modem, under control of the control processor.

17. The wireless communications terminal according to claim 16, further comprising:
an antenna; and
an antenna controller connected to the antenna; and
wherein, as a function of the switch from the first data path to the second data path, the antenna controller is configured to control the antenna to switch from pointing to the first satellite to pointing to the second satellite, under control of the control processor.

18. A system comprising:
a plurality of satellites;
a gateway node (GW);
a global network operations center (GNOC); and
a satellite terminal (ST), comprising a control processor configured to monitor one or more local factors that indicate operational characteristics of data communications via a first data path between the ST and the GW via a first of the plurality of satellites; and
wherein the control processor of the ST is further configured to determine that the data communications via the first data path are affected by one or more conditions, based on a determination that at least one of the one or more local factors satisfies a respective predetermined state of the first data path, wherein each predetermined state reflects at least one of the one or more conditions affecting the data communications via the first data path,
wherein the control processor of the ST is further configured to determine a second data path the data communications between the ST and the GW via a second of the plurality of satellites, wherein the second data path is not affected by the one or more conditions affecting the first data path,
wherein the control processor of the ST is further configured to determine to switch the data communications between the ST and the GW from the first data path to the second data path,
wherein the GW and the GNOC are located remote from the ST,
wherein the determination to switch the data communications from the first data path to the second data path is based on an evaluation of one or more policy-based rules applicable to the data communications in view of the one or more conditions, and
wherein the GNOC includes a unified network management system configured to control the policy-based rules based on a global view of the plurality of available wireless communications networks and overall objectives of respective service providers operating the plurality of available wireless data communications networks and optimization considerations for the plurality of available wireless data communications networks.

19. The system according to claim 18, wherein:
the GNOC comprises a network management processor configured to monitor one or more external factors related to the first data path, and to transmit the monitored one or more external factors to the ST; and
the control processor is further configured to receive the one or more external factors from the NOC, and wherein the determination that the first data path is affected by the one or more conditions comprises determining that at least one of the one or more external factors satisfies a respective predetermined state, wherein each predetermined state reflects at least one of the one or more conditions affecting the first data path.

20. The system according to claim 18, wherein the ST further comprises a first modem and a second modem, and wherein the control processor of the ST is further configured to control an operational data path of the ST to communicate with the first satellite utilizing the first modem for the first data path, and wherein the control processor ST is further configured to switch from the first data path to the second data path by switching the operational data path from the first modem to the second modem and configuring the operational data path to communicate with the second satellite utilizing the second modem for the second data path.

* * * * *